United States Patent [19]

Ovshinsky et al.

[11] 4,346,449

[45] * Aug. 24, 1982

[54] DATA STORAGE AND RETRIEVAL SYSTEM

[75] Inventors: Stanford R. Ovshinsky, Bloomfield Hills; Peter H. Klose; Wayne P. Messing, both of Troy, all of Mich.

[73] Assignee: Energy Conversion Devices, Inc., Troy, Mich.

[*] Notice: The portion of the term of this patent subsequent to May 27, 1997, has been disclaimed.

[21] Appl. No.: 91,454

[22] Filed: Nov. 5, 1979

Related U.S. Application Data

[63] Continuation-in-part of Ser. No. 724,084, Sep. 16, 1976, Pat. No. 4,205,387.

[51] Int. Cl.$^3$ .................. G06F 3/12; G06F 15/40; H05B 1/00; G01D 15/10
[52] U.S. Cl. ..................... 364/900; 219/216; 219/543; 346/76 PH; 346/151; 355/19
[58] Field of Search ............. 364/200, 900, 518, 520, 364/521, 523; 346/76 R, 76 PH, 76 L, 139 C, 77 R, 77 E, 151, 154, 155, 158-161, 110 R, 110 V; 219/216, 543; 400/120; 365/47; 350/96.24, 96.25, 96.28, DIG. 1; 355/1, 9, 3 DD, 19, 5, 20, 40, 44; 354/4, 5, 7, 10, 12, 6; 353/25, 26 R, 27 R, 27 A; 358/300, 302, 256, 901; 264/1.1, 1.3, 1.4, 1.5, 1.7, 22, 25

[56] References Cited

U.S. PATENT DOCUMENTS

| | | |
|---|---|---|
| 3,161,457 | 12/1964 | Schroeder et al. . |
| 3,167,747 | 1/1965 | Hughes ........................ 346/151 |
| 3,267,801 | 8/1966 | Abbott, Jr. . |
| 3,325,786 | 6/1967 | Shashoua . |
| 3,327,314 | 6/1967 | Zeuthen . |
| 3,328,776 | 6/1967 | Hughes ........................ 346/151 |
| 3,465,352 | 9/1969 | Carlson ....................... 346/76 L |
| 3,478,191 | 11/1969 | Johnson et al. . |
| 3,506,779 | 4/1970 | Brown ......................... 346/77 R |
| 3,534,396 | 10/1970 | Hart .............................. 364/200 |
| 3,578,946 | 5/1971 | Colello . |
| 3,594,759 | 7/1971 | Smura . |
| 3,614,767 | 10/1971 | Carrell . |
| 3,688,656 | 9/1972 | Applequist ..................... 355/19 |
| 3,701,999 | 10/1972 | Congleton ..................... 346/76 L |
| 3,757,351 | 9/1973 | Simms ............................ 346/158 |
| 3,777,116 | 12/1973 | Brescia et al. . |
| 3,815,094 | 6/1974 | Smith . |
| 3,820,076 | 6/1974 | Butts ............................ 353/27 A |
| 3,862,394 | 1/1975 | Lane . |
| 3,872,453 | 3/1975 | Tsukamoto .................... 365/125 |
| 3,936,178 | 2/1976 | Kuehnle ........................... 355/5 |
| 3,956,587 | 5/1976 | Nelson . |
| 3,965,476 | 6/1976 | Wenander ..................... 346/76 L |
| 3,966,317 | 6/1976 | Wacks ............................. 355/19 |
| 3,986,011 | 10/1976 | Poole ............................. 364/200 |
| 3,992,090 | 11/1976 | Lysle ............................. 346/151 |
| 4,002,829 | 1/1977 | Hutchison ..................... 346/76 L |
| 4,003,061 | 1/1977 | LaCanfora . |
| 4,012,132 | 3/1977 | Lazarus ......................... 364/900 |
| 4,052,208 | 10/1977 | Martinelli ..................... 346/76 R |

Primary Examiner—James D. Thomas
Attorney, Agent, or Firm—Lawrence G. Norris

[57] ABSTRACT

A data storage and retrieval system is provided utilizing digital or analog data input signals to energize one or more data recording heads which can produce a selection of sizes of alpha-numeric, pictorial or digital coded images on a recording medium. Where alpha-numeric or pictorial images are produced, the images are both human and machine readable. Such alpha-numeric or pictorial images can be sequentially or simultaneously selectively produced full sized and/or reduced substantially in size to form at least 24:1 or greater size reductions of these images on the same or different recording media. Thus, for example, X-ray pictures or letters and the like can be simultaneously produced in reduced form on a microfilm recording medium for record storage purposes and full sized simultaneously on a recording medium for direct examination and delivery to third parties. The reduced data is directly human readable by projecting light preferably through the recording medium and magnifying and projecting the image on a screen. Alternatively, the data is machine readable as by scanning small segments of the image with a capacitance or resistance responsive or photo-electric display device, to develop electrical signals which can operate conventional display readout devices. The microfilm recording and electrical readout operations most advantageously are achieved by supporting the recording head or readout unit on a carrier which moves across the recorded area of the recording medium in a line-by-line scanning operation, carried out so rapidly that a complete page of information can be recorded upon the recording medium or read therefrom in at most a manner of a few seconds or less.

32 Claims, 22 Drawing Figures

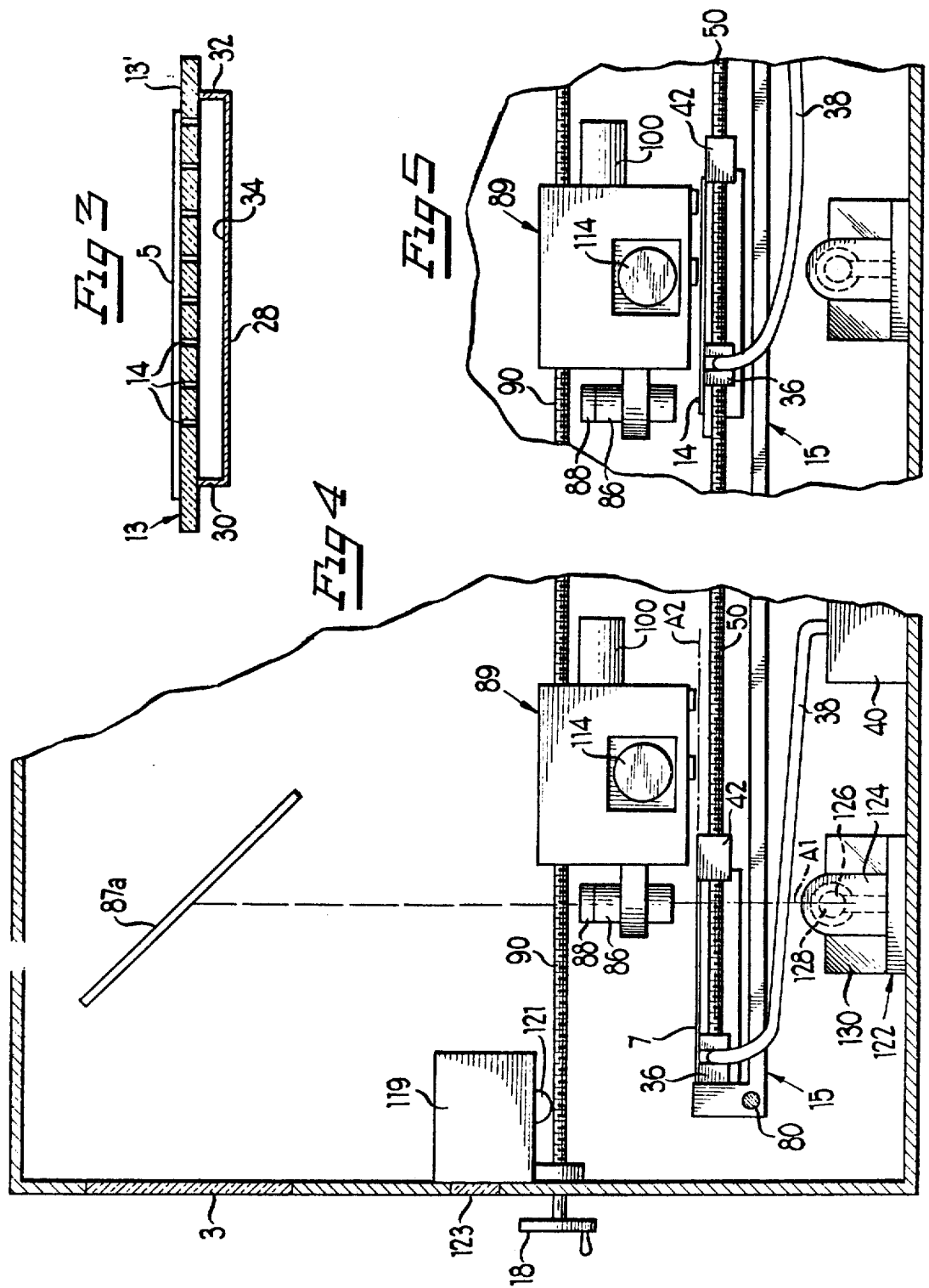

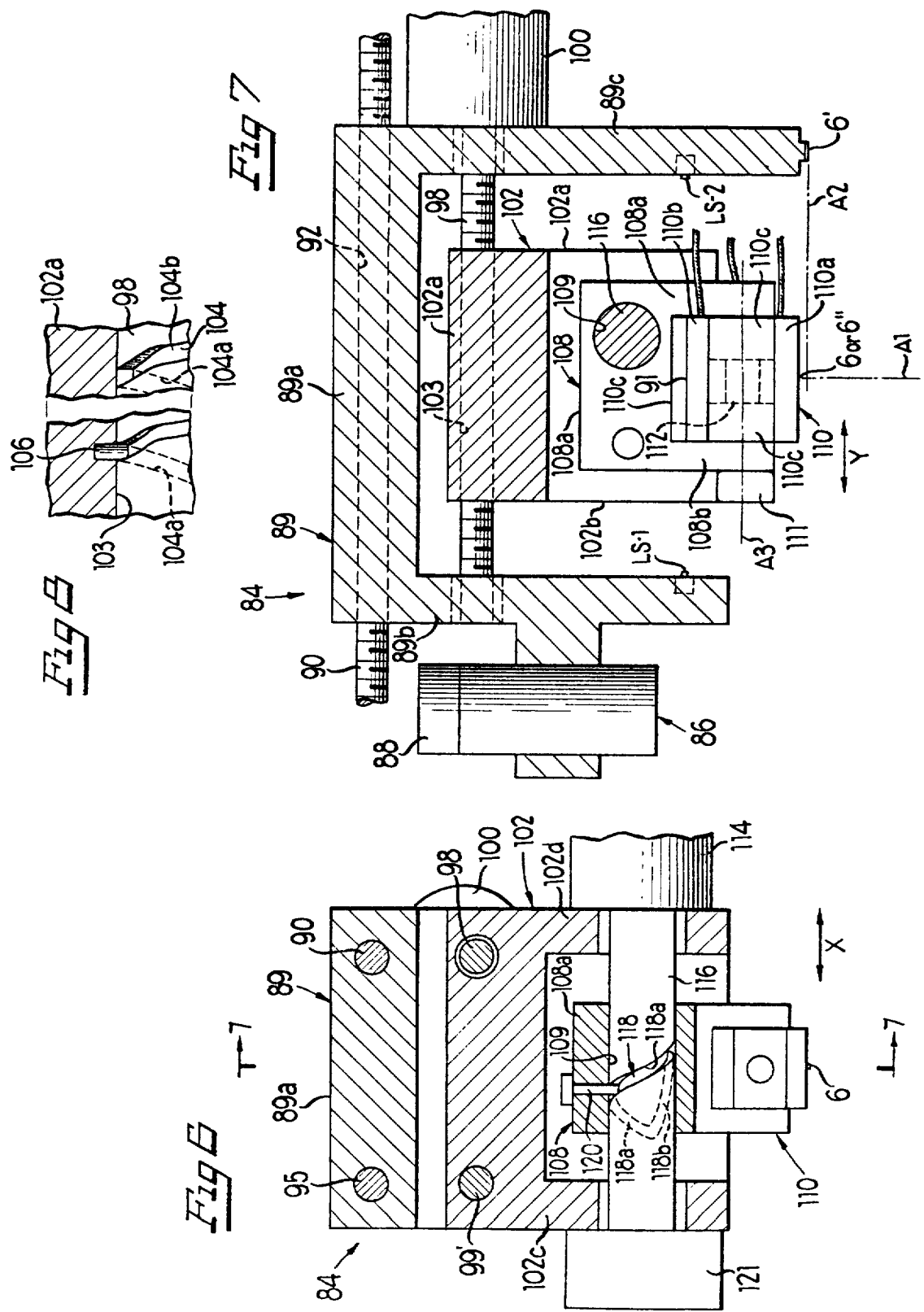

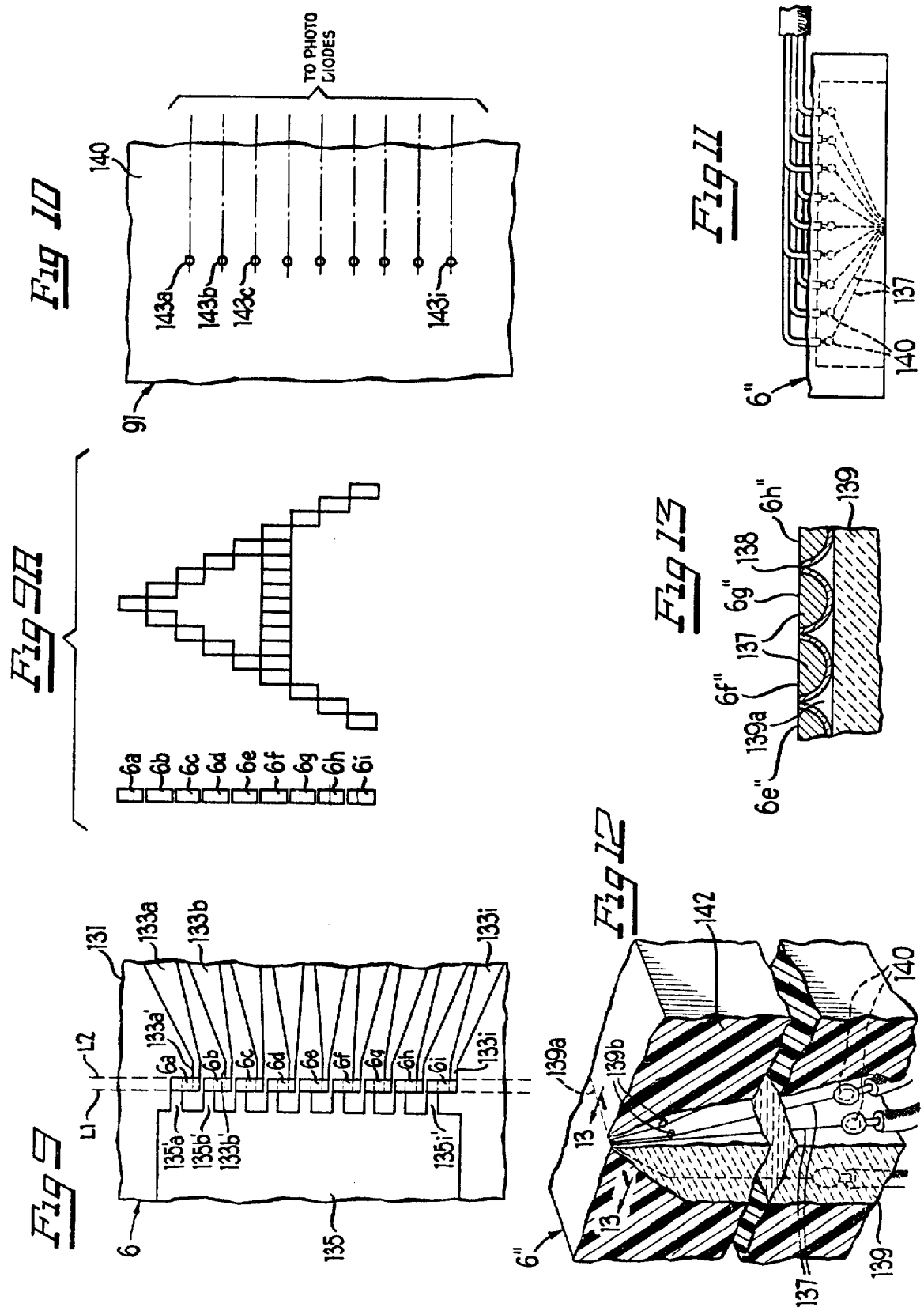

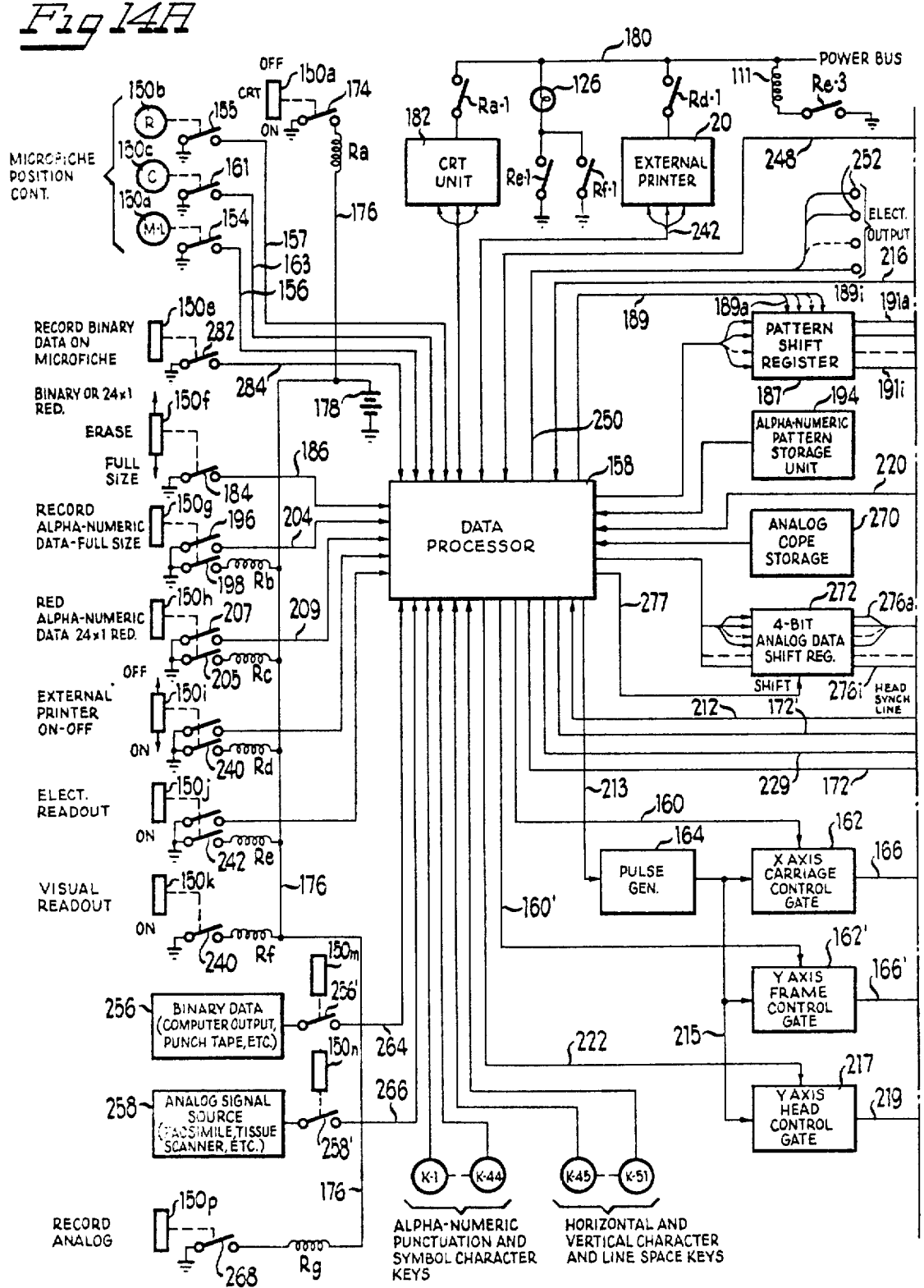

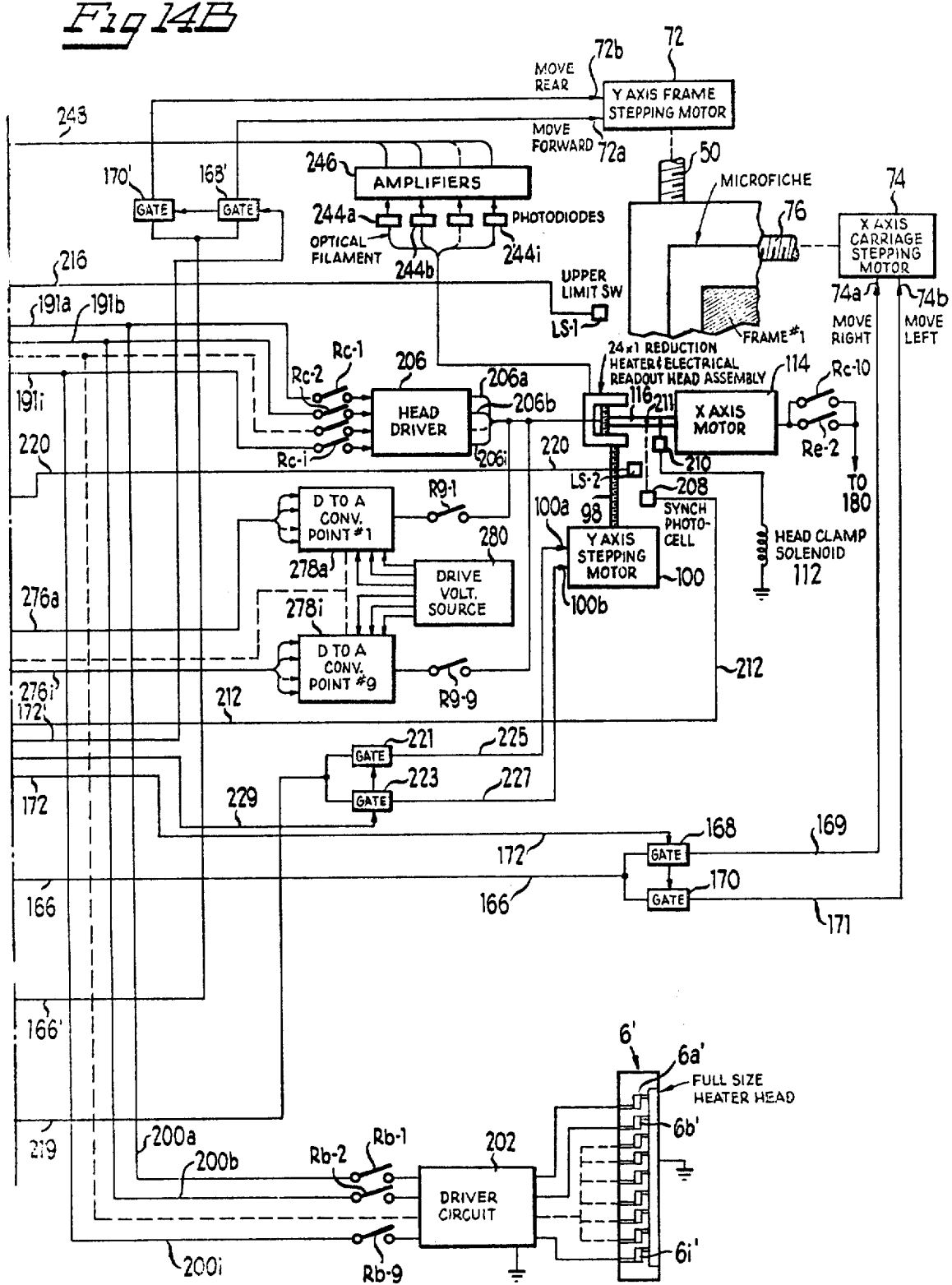

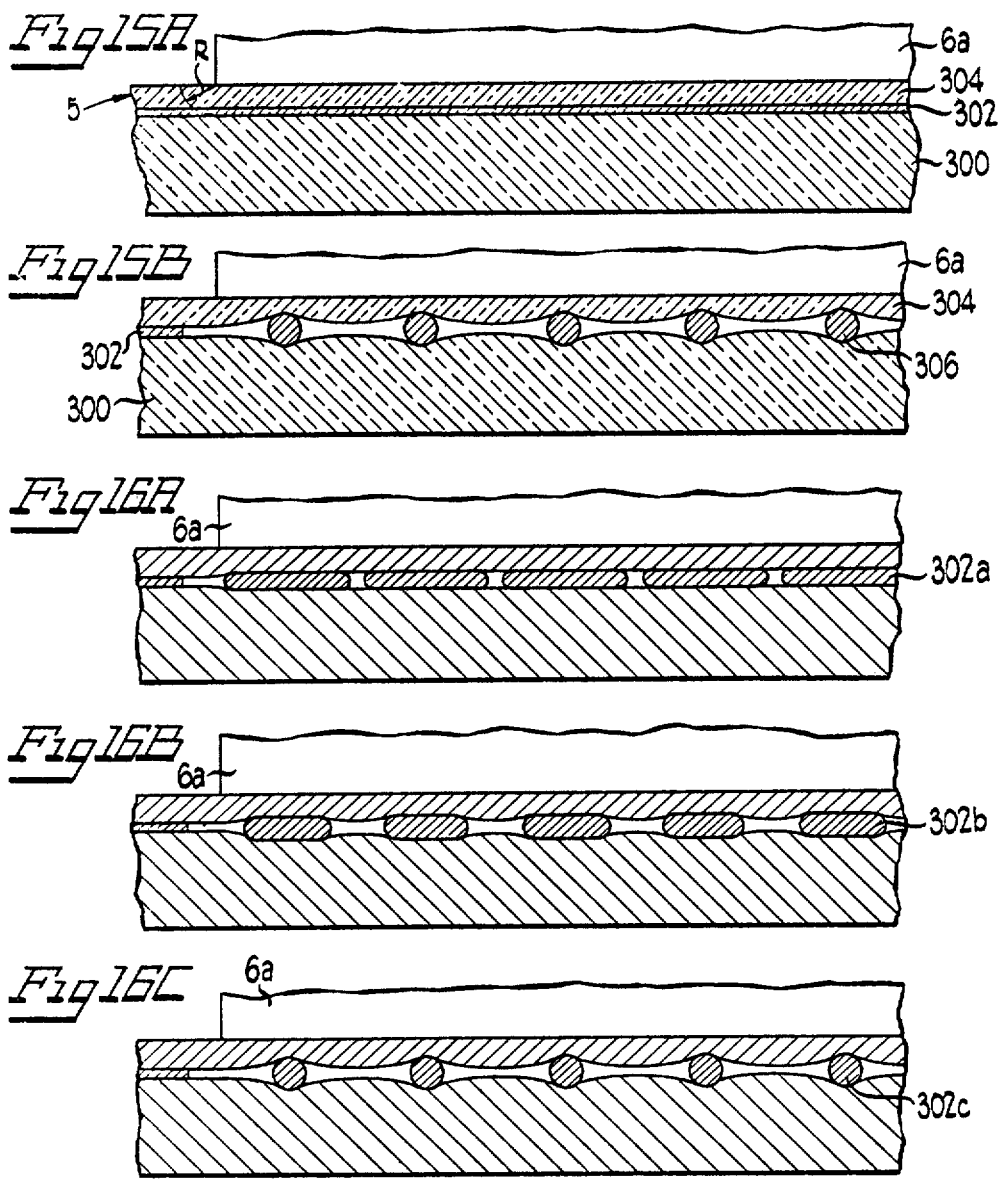

DATA STORAGE AND RETRIEVAL SYSTEM

RELATED APPLICATION

This application is a continuation-in-part of U.S. application Ser. No. 724,084, filed Sept. 16, 1976 for a Data Storage and Retrieval System, and now U.S. Pat. No. 4,205,387.

BACKGROUND AND SUMMARY OF THE INVENTION

The present invention relates to data storage and retrieval systems. In its most sophisticated form, the present invention uniquely provides at a data processing station, preferably equipped with a typewriter-like keyboard, control means for providing a dry process, human and machine readable microfilm record of said image pattern from digital or analog electrical data input signals either originating externally of the data processing station or generated, for example, by depression of the keys of the typewriter-like keyboard. The control means preferably provide for a selection of sizes of the alpha-numeric character or picture-forming images formed on a microfiche card or other recording medium. Thus, for example, the control means selectively can produce full-sized alpha-numeric title-forming images on a title-receiving portion of a microfiche card, so that the subject matter of the microfiche card can be directly viewed by the operator, or minutely-sized images on a selected frame of the microfiche card. Full-sized images can also be recorded simultaneously with the recording of the minutely-sized images on a recording medium. These images duplicate the data recorded on the microfiche card, so that recorded data can be directly read by the operator or by one desiring immediately to use the information without the use of microfilm projection means, or can be sent as or like hard copy to others by mail or otherwise. By operating still other control means, analog electrical signals representing medical X-ray or other pictorial data are received, processed and fed to the imaging means to record the same in greatly reduced size on the frames of a microfiche card or other recording mediums. Other control means enable the operator to directly view data previously recorded on a selected microfiche card frame by conventional light projection or other means, or uniquely to generate electrical signals directly from the images on a selected microfiche card frame which can operate conventional remote display devices.

One of the most important applications of the present invention is as a replacement for present mechanical typewriters used in offices and the like, where it is desired to eliminate completely the need for initially preparing letters, reports, and the like on paper for office record purposes. In the present invention, the operation of alpha-numeric character producing keys produces microfilm records directly or by transfer from buffer storage to dry process-developed microfiche cards or the like, where alpha-numeric character reductions of as much as 24 to 1 and greater are achieved. As previously indicated, if a hard copy is desired for mailing or the like, simultaneously with the production of the microfilm records a duplicate hard copy is produced on a typewriter or other printing device. There is thus no necessity for keeping paper records of any kind since all initially prepared letters, data records, reports etc. are produced on microfiche cards of the like. Additionally, data can be added at any time to any point of a microfiche frame on which data was not previously recorded, unlike typical wet processed developed microfilm.

An important aspect of the invention, which greatly facilitates the commercialization of the invention, is the use of a unique imaging means having micro-sized and spaced image-forming points which can produce a high packing density of dot images on a recording medium. Where digital coded data is recorded by such an imaging means, the resultant record can replace presently available flexible disc, tape cartridge, and other similar magnetic data storage media used in computer systems and the like with substantial cost savings. For example, the image-forming points which can be formed preferably by current-carrying Joule heat-producing points, or by light emitting diodes, or the ends of fiber optic filaments extending from such diodes, each point having dimensions preferably no greater than about 14 micron and less desirably no greater than about 20 micron to produce a similarly sized dot image on a heat or light responsive recording medium. A continuous energizing electrical signal may be fed to such heat or light producing means where pictures or curves rather than alpha-numeric characters are being recorded, provided the imaging means is moved along the recording medium at speed preventing undue spreading of the results of the heat or light energy involved.

Printers have been heretofore developed using heating heads to record on paper record media, the heads comprising a matrix or linear array of current-carrying segments which receive current which generates heat within the segments by Joule (current) heating conducted to, or sparks or current in, an adjacent paper recording medium, to create an image therein of alpha-numeric characters of about the same size produced by the type of conventional typewriters or a picture or curve of a size directly visible discernible, but it was not appreciated by those having knowledge of these printers that Joule heat sources could be miniaturized and used to form micro-sized dot images in a heat-responsive recording film to produce as much as 24 to 1 and greater reductions of alpha-numeric or correspondingly reduced picture images therein which can be readily viewed by conventional microfilm projection techniques. Thus, it is believed that U.S. Pat. No. 3,599,228, U.S. Pat. No. 3,852,563, U.S. Pat. No. 3,862,394 and U.S. Pat. No. 3,903,393 disclose heat-applying printing heads which can produce only ordinary type-sized alpha-numeric images or readily directly visible pictures. U.S. Pat. Nos. 3,852,563 and 3,599,228 each disclose rows and columns of current-carrying heat generating points which, because of the configuration comprising large numbers of orthogonally related conductors, makes it extremely difficult if not impossible to achieve imaging capable of producing microform reductions of the order of magnitude of 24 to 1. While U.S. Pat. No. 3,852,563 discloses integrated circuit structures, since the integrated circuit diodes must pass appreciable amounts of current, the resulting diode sizes as well as the conductor configuration make the heating head unsuitable for producing the substantial image reductions as referred to. U.S. Pat. No. 3,962,394 shows a heat applying head with resistance wire supported within spaced grooves in a wire positioning bar, and U.S. Pat. No. 3,903,393 discloses a heat applying head formed by the deposition of thick resistive films, and these heads are also impractical for producing reductions of the degree required for microfilm records.

The micro-sized imaging means utilized in the invention are capable of producing 24 to 1 and greater reduced microfilm records like that produced by laser beams heretofore moved over heat-responsive recording media which absorb the laser beam energy to produce transparent or opaque images therein. However, the use of laser beam energy for this purpose requires very expensive, bulky, and inefficient equipment. For example, efficiencies of laser beam energy source suitable for producing microfilm records like that achieved by the present invention commonly operate with efficiencies less than 1 percent. In such case, the power supplies required to supply the needed amount of energy are very expensive and large in size. An additional problem with laser beam energy sources is that the present OSHA specifications do not permit the use of laser beam sources in such environments as business offices and the like. In contrast, the imaging means used in the present invention are safe, compact and relatively inexpensive power sources and are useable in all environments.

In Joule heat-producing imaging means, while Joule heating may be produced within the recording medium by the flow of current between very small current-carrying conductors and the recording medium, micro-sized images are best achieved by using a linear array of closely spaced current-carrying resistance-forming points which form micro-sized heating points. A linear array of resistance-forming points are preferably formed from very thin filaments of juxtaposed resistance wires coated with a thin film of insulating material, and having aligned V-shaped portions formed by stretching the same over the feathered edge of an insulating substrate, with the pointed ends thereof remaining exposed. The substrate and filaments of resistance wires are formed into a monolithic body by potting the same in a synthetic plastic material. The exposed ends of the V-shaped portions of the filaments of resistance wire are so very closely spaced and the deposited film resistance-forming points referred to each occupy such a very small area (having dimensions preferably no greater than about 14 micron and less desirably no greater than about 20 micron) that up to 9 or 10 such current-carrying heat generating points can encompass a length less than about 200 micron, and so can generate by selective energization thereof as the heating heads described are advanced along a recording medium alpha-numeric characters of a size reduction of the order of at least about 24 to 1.

When the imaging means comprises Joule heat-producing points, the heat-responsive recording medium is also important in the production of micro-sized images. Practically all of the heat-responsive recording media heretofore utilized by the afore-mentioned printers using heating heads are unsuitable for producing micro-sized images. In the first place, these recording media comprise heat sensitive coatings applied over or impregnated into the fibers of a paper substrate. The thicknesses of the coating utilized and the rough texture of the substrate were generally such that images of the small sizes produced by the present invention are not producible therein. Also, these recording media do not produce a pattern of transparent and opaque areas, so that the information recorded thereon cannot be read by projecting visible light therethrough to produce the most easily readable magnified images, as do the most desirable recording media.

For most of the applications of the present invention using Joule heat as the imaging energy, the recording medium comprises a solid transparent substrate of a suitable synthetic plastic material, like Mylar, upon which is coated a film of heat-responsive imaging material of thicknesses generally less than about 0.2 micron. To protect the imaging film material from wear during handling it is generally desirable to apply a protective coating thereover. The overall thickness between the outer surface of the protective coating and the inner surface of the imaging film next to the substrate should preferably not be much more than about 0.5 micron and less desirably not much greater than about 2 micron, to avoid the undesired spreading of the heat therein which could cause image sizes much greater than the size of the current-carrying points of the heat applying head utilized in the present invention. Film thicknesses are of particular importance where visible images are to be projected upon a viewing screen and the imaging material is initially opaque and is rendered transparent by the application of heat thereto. In such case, for the transparent area to permeate completely the thickness of the film of imaging material, the heat must extend through the entire thickness thereof. Since the heat spreads in all directions through the film, overall film thicknesses in excess of about 2 micron would increase the size of the images produced so that the image resolutions achieveable are inadequate to produce sharp magnified images for alpha-numeric data reductions of the order of magnitude of about 24 to 1 and greater.

While the heat-responsive films could be transparent films, like the diazo-type, vesicular-type, or dry silver-type films, modified to be insensitive to light and highly sensitive to heat, and resettable amorphous chalcogenide films disclosed in U.S. Pat. No. 3,530,441 and organo-metallic films like that disclosed in U.S. application Ser. Nos. 596,646 (now U.S. Pat. No. 4,142,896), 596,617 (now abandoned) and 596,616 (now U.S. Pat. No. 4,066,460) all filed July 17, 1970, when they are utilized with appropriate small thicknesses as described, the preferred type of heat-responsive recording medium is the initially opaque type of films disclosed in U.S. application Ser. No. 577,003 (now U.S. Pat. No. 4,267,261), filed May 13, 1975. The preferred film applied to the substantially transparent substrate is a solid high optical density and substantially opaque film of a dispersion imaging material, which upon application thereto of Joule heat energy above a certain critical value, changes to a substantially fluid state in which the surface tension of the material acts to cause a substantially opaque film subjected to the heat energy to disperse and change to a discontinuous film comprising openings and deformed material which are frozen in place following the application of the heat energy. Generally, the openings occupy a much greater area than the deformed material over the region heated by a single heat producing point of the heat producing head so that when light projected through this region of the film it appears like substantially the entire area thereof is transparent.

When it is desired to produce an image having a varying degree of transparency, to produce X-ray films or pictures with a gray scale variation in the recording medium, then the film is similar to that just described except that the film of imaging material includes means for retarding the change in the discontinuous film caused by surface tension and for controlling the amount of such change in accordance with the intensity of the applied heat energy above the critical value, so that the optical density of the film varies in accordance with the intensity of the heat energy applied thereto above the critical value.

In the most preferred form of the invention, the imaging means in a recording head as described is mounted on a support which preferably continuously scans a frame of a microfiche card or other recording medium on a line-by-line format, as in the case of an electron beam scanning the face of a cathode ray tube, so that an entire frame of a microfiche card can be recorded with the alpha-numeric information in about a few seconds or less. In such case, the microfiche card is indexed only to bring a record starting point of a selected frame opposite the recording head prior to the start of a scanning operation. The relatively light-in-weight recording head can be moved at high scanning speeds not practical, for example, if the microfiche card support frame were to be moved relative to the heating head in the X and/or Y axis directions.

Electrical signals can be generated from the recording medium most advantageously by the use of an electrical readout head which scans a light projected image by moving the microfiche card or other recording medium relative to light responsive elements of the electrical readout head or by moving the reading head relative to the recording medium. However, it is preferred to mount the electrical readout head on the same or support frame similar to that which carries the heating head, so that the electrical readout head scans in a line-by-line progression the entire frame of information involved at high scanning speeds. In such case, the readout head most preferably comprises a number of optical filaments of a size and spaced like the current-carrying points of the above described micro-sized heating head. While full-sized printed matter has been scanned by a spot of light reflected upon a photocell to produce electrical signals fed to facsimile recorders, it has not been appreciated that microfilm recorded data could be directly machine readable as just described.

The above described and other features and advantages of the invention will become more apparent upon making reference to the specifications to follow, the drawings and the claims.

DESCRIPTION OF DRAWINGS

FIG. 1A is a block diagram of the basic functional units of the simplest form of data processing station used only as a data microform recorder;

FIG. 3 is a sectional view through FIG. 2, taken along section line 3—3 therein to show the construction of the carriage structure for the microfiche card appearing in FIG. 2;

FIG. 4 is a fragmentary enlarged sectional view through the housing shown in FIGS. 1–2 showing the unit which carries the projecting lens and the heating and electrical readout heads when the unit is positioned to bring the projecting lens into operative position to project an image of the microfiche frame involved onto a projection screen;

FIG. 5 is an elevational view of the microfiche support carriage and the unit which carries the projecting lens and the heating and electrical readout heads when the unit is positioned to bring the 24 to 1 reduction heating head into a recording position;

FIG. 6 is an enlarged fragmentary vertical sectional view through the lens and heating head carrying unit shown in FIGS. 4 and 5, and shows the manner in which the heating head is reciprocated in the X axis direction;

FIG. 7 is a sectional view taken along section line 7—7 of FIG. 6 and illustrates the manner in which the heating head is reciprocated along the Y axis;

FIG. 8 is a greatly magnified, fragmentary sectional view through part of the lens and heating head-carrying unit and shows details of a screw and the heating head-carrying frame to illustrate the manner in which rotation of the screw reciprocates the heating head-carrying frame;

FIG. 9 is a view of the end face of the 24 to 1 reduction heating head and shows the current-carrying Joule heat-producing points or segments of the heating head;

FIG. 9A shows the current-carrying points or segments of the heating head of FIG. 9, positioned along side the letter A produced thereby as the heating head is moved progressively along the X axis;

FIG. 10 is a view of the end face of the electrical read-out head, showing the ends of the optic filaments which receive light projected through a frame of the microfiche card.

FIG. 11 is a perspective view of an alternative form of a heating head for producing 24 to 1 image reductions which can be used instead of the heating head shown in FIG. 9;

FIG. 12 is a greatly enlarged fragmentary sectional view through the heating head of FIG. 11;

FIG. 13 is an enlarged sectional view of the heating head of FIG. 11, taken along section line 13—13 therein;

FIGS. 14A and 14B together form a block diagram of the electrical control circuitry for operating the various electrically operated devices of the apparatus shown in FIGS. 1–13;

FIGS. 15A and 15B are greatly magnified fragmentary sectional views of the preferred microfiche card using a preferred heat-responsive imaging layer and showing respectively its structure of this layer before and after head above a critical value is applied thereto; and FIGS. 16A, 16B and 16C respectively show the manner in which the microfiche card imaging material responds to different levels of heat above a critical value when a modified gray scale-producing imaging layer is substituted for the imaging layer of FIGS. 15A and 15B.

DESCRIPTION OF EXEMPLARY FORMS OF THE INVENTION SHOWN IN THE DRAWINGS

Figure 1:
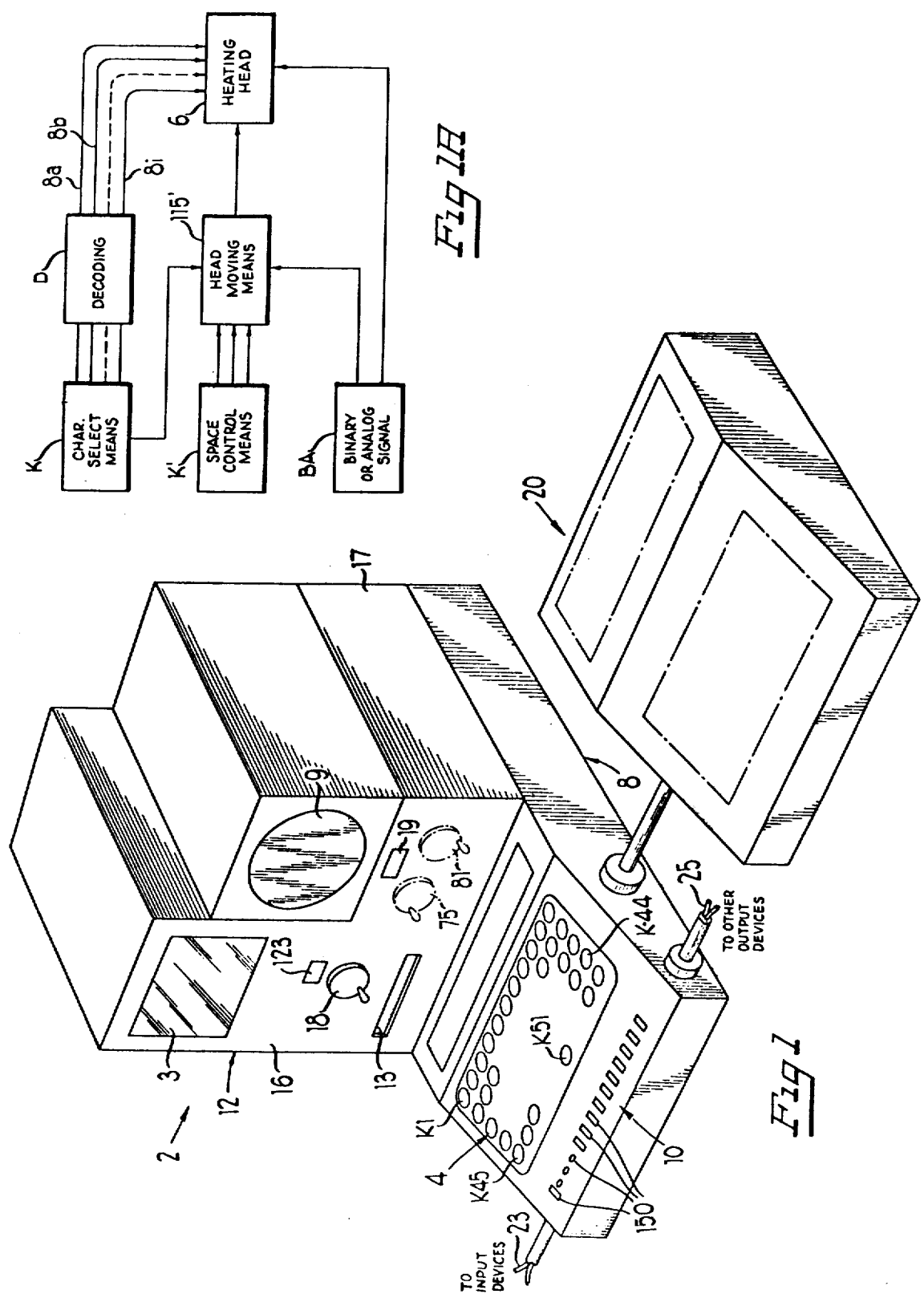
FIG. 1 is a perspective view of a data processing station incorporating the present invention.

Refer now more particularly to FIG. 1 which shows a data processing apparatus 2 of the present invention which, among other things, may replace a typical typewriter station in a business office or the like. This apparatus includes a keyboard 4 having alphabet and numeric characters, punctuation and symbol-producing keys K1–K44 which may be similar to that found on a conventional typewriter keyboard, various horizontal and vertical character and line spacing keys or the like K45–K51 which carry out functions analogous to typewriter spacing controls which space a typewriter carriage in directions to effect forward or backward character spacing, up and down line spacing and return to the beginning of a line operations. One main objective of the data processing apparatus 2 is to produce micro-sized recording of data on a recording medium which, especially in the case of alpha-numeric and curve or picture data, would most advantageously be in the form of a microfiche card 5 (see FIG. 2) made of a material which can be projected onto a projection screen 3 or from which electrical signals can be generated for feeding to external devices like computers, telephone lines, printing devices and the like. The microfiche card 5 may be made of a heat-responsive material which may be divided into various rows of frames each of which when data is recorded therein represents about a 24 to 1 or greater size reduction of recorded data. For the purpose of frame location, it will be assumed that the various rows of the microfiche frames as used in this description are identified by alphabet characters B through H (the row A being used for full-sized title information), and the frames in each row are identified by column position numbers in the order of frame position by the numbers 1 through 14.

A recording of data on a selected frame of the microfiche card is produced by a micro-sized image producing heat 6 (FIG. 9 or 11) to be described which at the appropriate time is physically reciprocated over and against a selected microfiche frame in a line-by-line scanning operation resembling the movement of a cathode ray beam across the face of a television cathode ray tube. The small image producing head 6 and its support structure is so light-in-weight that it can be moved at a very high speed, to scan the single microfiche card frame in a few seconds or less. To record directly readable title information on a microfiche card in the marginal or A row portion 7 thereof shown in FIG. 2, a full-sized image producing head 6' is provided (FIG. 7) which can be identical to the head 6 but larger in size. The image generating portion of the micro-sized heat producing head 6 may encompass a length somewhat less than 0.008", which is the spacing between successive lines of an alpha-numeric character reduction of approximately 24 to 1, whereas the image generating portion of an image producing head for full size alpha-numeric character recording may encompass the length of a full size alpha-numeric character produced by a conventional typewriter. In the most preferred form of the present invention, the image producing head produces heat as the imaging energy thereof. Along the length encompassed by the heat generating portion of the heat producing head 6 or 6' are a linearly arranged group of small current-carrying points or segments to be described, like the segments 6a–6i or 6a"–6i" shown in FIGS. 9 and 11.

In its simplest form, where alpha-numeric information is to be recorded, as shown in FIG. 1A, character selection means K (which may be in the form of individual keys like K1–K45 in FIG. 1 or other types of controls) are provided for the operator to select a particular alphabet or numeric character, and when operated closes a switch or the like connected to decoding circuit D which energizes one or more output lines 8a, 8b, . . . 8i extending to different current-carrying points or segments of the micro-sized heating head 6 to form a pattern of dot images or the like on the recording medium which forms the alphabet or numeric character involved. If these current-carrying points are arranged in rows and columns, where a single column encompasses the tallest character, a single letter or number can be generated at one instant of time on the recording medium. However, when the current-carrying points are arranged in rows and columns, the space limitations in gaining access in both X and Y directions to all of the current-carrying points make it difficult to closely space the points to achieve good resolution and clear images for 24 to 1 and greater data size reductions, and so the current-carrying points are advantageously arranged in only one or at most two parallel columns, preferably of a height equal to that of the tallest character where conductors may extend to these points in directions transverse to the direction of point spacing. In such case, the decoding circuits D have means for sequentially feeding a succession of signals to the decoding circuit output lines 8a, 8b, . . . 8i as the heating head 6 is moved to successive positions to complete the formation of a single character. (A heating head comprising only a single current carrying point is suitable for picture or curve data recording, and, in such case, there is no need for a decoding circuit D when the heating head is fed from input signals analogous to the video signals used in television and facsimile recorders.)

The depression of a particular character selection means also effects energization of a head moving means 15' for controlling the movement of the heating head 6 for character spacing or for moving the head successively over the proportional parts of a character width where a successive pattern of energization signals are fed from the decoding circuit D in response to the operation of a single character key. Character and line spacing control means K' must also be provided so that the operator can select any particular character and line spacing operation, as in the case of a typical typewriter. Operation of any of these controls will then energize the head moving means 15' to effect the necessary positioning of the heating head 6 with regard to the recording medium.

While the data processing station 2 may operate in this direct manner, in the exemplary form of the invention now to be described the depression of the various alpha-numeric, punctuation, symbol and character and line spacing keys K1–K51 operate in a manner similar to that of presently available word processing automatic typewriters, wherein the characters represented by the depression of these keys is stored in a buffer storage unit advantageously contained within a housing 8 on top of which the keyboard 4 is located in FIG. 1. Also, as is found in some computer data input stations, simultaneously with the operation of character keys there is presented on a printer or face of a cathode ray tube 9 (as shown in FIG. 1) the presentation of what would appear on a sheet of paper of a typewriter after depression of the various keys involved. When a cathode ray tube is used, a position marker appearing on the face of the cathode ray tube identifies the position on the supposed sheet of paper upon which the next character would be typed if a conventional typewriter was involved. The operator is thus given a visual presentation of the data to be recorded on the microfiche card 5 when a data transfer operation is effected by operation of one of the controls shown on a control panel 10 shown at the front of housing 8. If a mistake is made, as in the case of a conventional word processing automatic typewriter, a correction can be made by merely operating a character key to produce a desired character image at the position marked on the cathode ray tube face.

While the actual physical arrangement and construction of the various units making up the data transfer station 2 may vary widely, as illustrated, the housing 8 contains the basic module which consists of a microfiche support carriage, recording and readout unit generally identified by reference 12 which includes the aforesaid projection screen 3. A different readout unit may replace the unit 12 depending upon the desired features thereof. For example, such units may be designed to receive microfiche cards and have heat producing heads capable of producing only one degree of reduction of alpha-numeric data and while others may provide a selection of character reduction such as 96:1, and 48:1 as well as the 24:1 reduction. In the example of the invention to be described, the microfiche support carriage, recording and readout unit 12 is designed to produce on the microfiche card 5 only a 24 to 1 reduction of the alpha-numeric characters, as well as full type sized characters for tilting. In any event, as illustrated in FIG. 1, the unit 12 includes a microfiche-receiving slot 13 into which the microfiche card 5 is inserted. The microfiche card 5 is seated over a pair of positioning-pins 14—14 (FIG. 2) held in place by vacuum against an apertured, transparent, support wall 13' forming part of a microfiche holding frame 13 (FIG. 3). The microfiche support carriage, recording and readout unit 12 provides for automatic stepping motor controlled positioning of the microfiche support frame 13. In such case, for example, the control panel 10 may contain carriage and frame positioning controls which when operated move a carriage 15 and frame 13 to bring the selected frame of a microfiche card 5 opposite a lens, recording head or readout head at a recording or readout station. These frames are identified by the letters B-H and numbers 1-14 in a window 19 on the front panel 16 of the housing 17 of unit 12.

In a manner to be described in detail, the aforementioned micro-sized heat producing head 6, the full sized head 6', an electrical readout head and lens to be described are mounted on a common support adapted selectively to be moved to the recording and readout station by manual rotation of a positioning wheel 18 mounted on the panel 16 of the unit 12.

Simultaneously with the recording of data on a selective frame of the microfiche card, there may be produced on a printer 20 a hard copy of the data recorded on the microfiche frame referred to on a suitable printer 20 which may be a conventional typewriter or other suitable printing device which, for example, may be a printer which has a heat-producing head like the full sized head 6' and, like presently commercially available heat operated printers, moves only horizontally back and forth as a heat-responsive sheet is indexed in a vertical direction relative to the heat-producing head.

As previously indicated, the present invention, in addition to producing on a microfiche card or the like alpha-numeric data, can also record on a similar recording medium or on the microfiche card 5 binary data, or facsimile or the like data capable of producing a gray scale picture. Electrical signals for producing such data may be fed to the processor 2 on suitable input lines 23 plugged into the housing 8. Electrical signals generated by the scanning of a selected microfiche frame or the like by the aforementioned electrical readout head produces electrical signals on output lines 25 extending to suitable output devices, which may include the input to a computer, facsimile transmission line, or the like.

Figure 2:
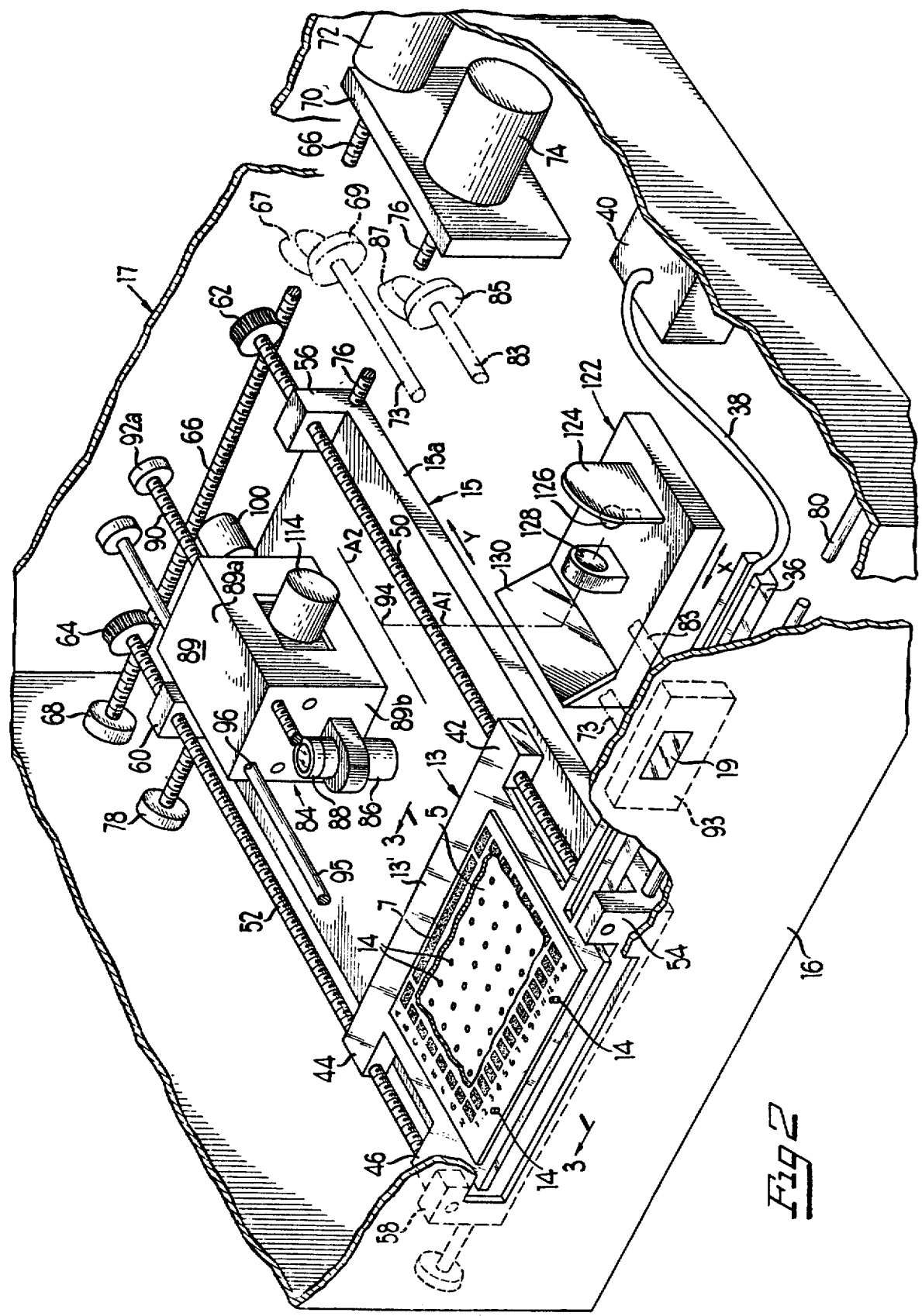
FIG. 2 is a perspective, broken-away view of and exemplary readout unit forming part of the microfiche carriage, recording and data processing apparatus shown in FIG. 1.

Refer now to FIGS. 2-4 which illustrate details of construction of the microfiche support carriage, recording and readout unit 12 of the preferred form of the invention now to be described.

As best shown in FIG. 3, the microfiche support frame 13 has a box-like structure formed by the apertured support wall 13' at the top of the frame, a bottom wall 28, and side walls 30 and 32 defining a chamber 34 communicating with the apertures 14 in the wall 13'. The chamber 34 communicates with a flexible suction tube 38 supported on an arm 36 extending from the wall 13'. The flexible tube 38 extends to a vacuum pump 40 which generates a low pressure in the chamber for holding the microfiche card 5 in a perfectly flat condition against the apertured support wall 13'. At least the upper and lower walls 13' and 28 are transparent to permit the passage therethrough of light from a projection lamp 29 during a visual or electrical readout of data from the microfiche card 5 in a manner to be explained.

The microfiche support frame 13 is supported for movement in a Y axis direction by means including spaced screws 50 and 52 respectively threading through laterally projecting arms 36–42 and 44–46 of the upper wall 13' of the frame 13. The screws 50 and 52 are rotatably supported in upwardly extending, bearing-forming projections 54–56 and 58–60 formed integrally with the carriage 15. The screws 50 and 52 are coupled by gears 62 and 64 to a screw 66 supported for rotation in bearings (not shown) supported from the carriage. A stepping motor 72 rotates an incremental angle when pulsed to advance the screws 50 and 52 through coupled thereto gears 62 and 64, to move the microfiche support frame 13 and corresponding incremental distance in the Y axis direction.

The carriage 15 is supported for movement along the X axis direction by means including a screw 76 threaded into the base 15a of the carriage 15 at the rear end thereof and extending between a stationary bearing 78 secured to the housing 17 and a bearing in the vertical support wall 70. A slide rod 80 slidably passes through an opening in the base portion 15a of the carriage 15 at the front thereof. The screw 76 is driven by a stepping motor 74 shown supported on the wall 70.

The stepping motors 72 and 74 receive pulses fed to either forward or reverse drive inputs for rotating the associated screws 66 and 76 in one direction or the other, to effect movement of the microfiche support frame 13 in one direction or the other along the Y axis and X axis directions. The microfiche support frame 13 is thus movable in the Y and X axis directions to bring any selected frame of the microfiche card opposite a recording and readout station 94 located at the intersection of a vertical reference axis A1 and a horizontal reference axis A2 shown in FIG. 2.

To provide the operation an indication of the position of the carriage 15 and the frame 13, the Y axis control screw 66 and the X axis control screw 76 are shown respectively provided with bevel gears 67 and 87 which respectively mesh with bevel gears 69 and 85, in turn, connected to shafts 73 and 83 extending to an indicator unit 93 which displays in window 19 on the front panel 16 of the microfiche carriage, recording and readout unit 12 indicia which signify, when the carriage 15 and frame 13 are in a loading position as shown in FIG. 2, and also letter and number indicia which identify the particular microfiche frame which is positioned at any given time at the recording and readout station 94. As noted, the microfiche frames are not opposite the recording and readout station 94 when the carriage 15 and frame 13 are in the microfiche loading position, so the window 19 displays at any one time only indicia of the kind indicating when the carriage 15 and frame 13 are in a loading position, or indicia identifying what particular microfiche frame is opposite the recording and readout station 94.

While the exemplary embodiment of the invention to be described shows automatic means for feeding the proper number of pulses to a forward or reverse motor rotation input of the stepping motors 72 and 74 in response to operation of microfiche positioning controls to be described, to lessen the cost of the equipment involved the carriage 15 and microfiche support frame 13 can be positioned manually by manually operable control wheels like 75 and 81 shown in phantom lines in FIG. 1 which could be connected to the above mentioned shafts 73 and 83.

Supported for movement in the Y axis direction at a point immediately above the section between the axes A1 and A2 is the lens, recording and readout head unit 84. Refer now more particularly to FIGS. 6 through 8 for a description of the same. The lens, recording and readout head unit 84 comprises a housing 89 having an upper wall 89a through which passes a screw 90 threading into a threaded aperture 92 in the upper wall 89. The screw 90 is shown extending between a bearing 92 supported on the rear wall of the housing 17 and a bearing (not shown) on the front wall of this housing. Also passing through the upper wall 89a is a stationary slide rod 95 which aids in guiding movement of the unit 84. The aforementioned manually operable control wheel 18 is secured to the front end of the screw 90 so that as the manual control wheel 18 is rotated in one direction or the other, the lens, recording and readout head unit 84 moves forward or backward in the Y axis direction.

Supported from a front wall 89b of the housing 89 is a magnifying lens unit 86 which is vertically oriented to receive a projected light image from one of the frames of the microfiche card 5, to magnify the same and direct the magnified image to a mirror 87 which projects the same upon the projection screen 3 exposed at the front of the housing 17. Also included in the optical projection path is an image inverter 88 to obtain a right reading image on the rear projection screen. The central axis of the lens 86 is in a vertical plane readout station 94 at its intersection with the vertical axis line A1. The unit 84 supports in a manner to be described the micro-sized heating head 6, the full sized heating head 6′, and an electrical readout head 91 (FIG. 7).

Rotatably mounted in bearings supported on the front and rear walls 89b and 89c of the housing 89 is a screw 98 preferably of a special type referred to as a "variable pitch screw", the screw 98 being driven by a stepping motor 100. The screw 98 carries a frame structure 102 which, among other things, carries the micro-sized heating head 6 and the electrical readout head 91. The frame structure 102 has an upper sleeve-forming portion (FIG. 8) 102a with a longitudinal passageway 103, the defining walls of which make a sliding fit over the exterior surface of the screw 98. As shown best in FIG. 8, the screw 98 has a continuously spiralling groove 104 which have equally spaced axially extending portions 104a and straight portions 104b which extend transversely only of the longitudinal axis of the screw 98. The axial distance between successive spaced portions 104b is equal to one line space of the data to be recorded on a microfiche card frame, such as 0.008 inches. A follower pin 106 anchored to the sleeve 102a of the frame structure 102 is in a mid-region of a straight groove portion 104b at the beginning of a line scan operation of the micro-sized heating head 6 or electrical readout head 91. During the period the pin 106 is in a straight groove portion 104b the micro-sized recording head 6 or the electrical readout head 91 will be scanning in an X axis direction to cross a full line of the microfiche frame involved. The pin 106 will then enter a portion 104a of the groove 104 which has an axial component of direction, which then advances the frame structure 102 until the pin 106 enters the next straight groove portion 104b it remains in such straight groove portion until the completion of another line scanning operation as just described.

The frame structure 102 has a pair of spaced guide-forming walls 102a-102b (FIG. 7) between which is slidably mounted a slide member 108. The slide member 108 has an upper portion 108a having a passageway 109 through which passes a grooved shaft 116 driven by electric motor 114. The shaft 116 has a groove 118 which has a portion 118a which spirals progressively, for example, over an arc encompassing 270 degrees of the circumference of the shaft 116 and a return portion 118b extending 90 degrees around the shaft which returns to the beginning of the groove portion 118a. A follower pin 120 carried by the slide member 108 extends into the groove 118 so that continued rotation of the shaft 116 will continuously reciprocate the slide member 108 back and forth. During the first 270 degrees of rotation, the slide member 108 reciprocates at a relatively slow speed in comparison to its speed of return movement during the subsequent 90 degrees of rotation of the shaft 116 as the pin 120 rides within the return groove portion 118b.

The shaft 116 extends into a photocell control signal generating unit 121 which generates synchronizing pulses and control signals used to synchronize the feeding of current pulses to the current-carrying points of heat producing head 6 and to control the time when the head 6 is moved from contact with the microfiche card.

As best shown in FIG. 7, the slide structure 108 has front and rear spaced walls 108a and 108b between which is mounted for rotation about a given axis A3 a head carrying assembly 110 having on one side of the axis A3 the micro-sized heating head 6 supported on a carrier plate 110a and on the other side of the axis the electrical readout head 91 supported on a carrier plate 110b. The carrier plate 110a is carried by a solenoid 112, which, together with the carrier plate 110b is secured to a central body portion 110c connected in any suitable way to a solenoid 111. When the solenoid 112 associated with the carrier plate 110a is deenergized, the heating head 6 is in its maximum downwardly spaced position where the heating head is pressed against the surface of a microfiche card 5. When the solenoid 112 is energized, it withdraws the carrier plate 110a carrying the heating head 6, so that the heating head 6 is removed from contact with the microfiche card. When the solenoid 111 is energized, the central body 110c and the various described elements carried thereby are rotated into a position where the electrical readout head 91 faces downward, and when solenoid 111 is de-energized the assembly 110 just described is rotated into a position where the heating head 6 faces downward, as shown in FIG. 7.

As previously indicated, the micro-sized heating head 6 moves at its maximum speed when the pin 120 is in the portion 118b of the slot 118 in shaft 116 (FIG. 6). To minimize wear of the microfiche card it is desirable to remove the head 6 from contact with the microfiche card during this very high speed of movement of the heating head to the beginning of a line position.

To simplify programming of the electrical control portions of the data processing station, position signals are generated by various parts of the microfiche carriage, recording and readout unit 12. For example, limit switch means LS1 and LS2 may be provided on the front and rear housing walls 89b and 89c which generate a signal when the head carrying frame structure reaches its outer limits to initiate a reversal in the direction of rotation of motor 100. The full sized heating head 6' is carried on the end of the rear wall 89c of the housing 89. The heating head 6' is at a level slightly above that which the heating head 6 occupies when the solenoid 112 is in its de-energized state, that is when the heating head 6 in its lowermost position. (FIG. 7 shows the heating head 6 in the position when the solenoid 112 is energized.)

As previously indicated, the manually operable control wheel 18 is rotated to bring either the center point of the magnifying lens 86, the heating head 6', or the electrical readout head 91 into position at the recording and readout station 94. To communicate to the operator the particular position of the lens, recording and readout unit 84, a suitable indicator device 119 shown in FIG. 4 is provided with a gear 121 meshing with the screw 90 to provide an indication in a viewing window 123 on the front panel 16 of the unit 12 when the center point of the lens, or the microsized heating and readout heads 6 and 91, or the full sized heating head 6' is in a proper position at the recording and readout station 94. FIG. 5 illustrates the heating head 6' in position at the recording and readout station 94, whereas FIG. 4 illustrates the lens 86 in position at the recording and readout station 94. In the latter position of the lens 86, a suitable lamp 126 shown mounted opposite a reflector-forming wall 124 directs light through a condensing lens 128 which projects the light against a mirror 130 which directs the light through the card frame in position for readout at the recording and readout station 94. The light projected through the microfiche card frame then passes through the lens 86 which magnifies the light image passing through the microfiche card frame and directs the resultant image to a mirror 87a which directs the same to the projection screen 3.

Refer now more particularly to FIG. 9 which illustrates one exemplary construction for the micro-sized heating head 6. As there shown, the heating head 6 may comprise a substrate 131 made of a suitable ceramic material upon which has been sputter, vapor or otherwise deposited a thin film of a conductive coating which by suitable well known masking or masked etching techniques produce a pattern of outwardly flaring conductive areas 133a, 133b, ... 133i, as shown terminating at one longitudinal margin of the substrate 131. These areas terminate at their inner ends along a line L1 in relatively narrow rectangular terminal portions 133a', 133b', ... 133i' spaced evenly therealong. The conductive deposits also form a relatively long rectangular terminal-forming portion 135 at the opposite longitudinal margin of the substrate 131 from which extend narrow rectangular portions 135a', 135b', ... 135i' shown in spaced interleaving, overlapping relationship with terminal portions 133a, 133b, ... 133i and terminating along a line L2 parallel to line L1, to form various contiguous pairs of confronting terminals for the individual current-carrying heat-producing points 6a, 6b, ... 6i. These current-carrying points may be formed by initially sputter, vapor or otherwise depositing a narrow-ribbon of a thin film resistance material overlapping all of said confronting terminals and then by a mask-etching technique well known in the art etching away spaced portions of this film to form the isolated current-carrying points or segments 6a, 6b, ... 6i, as illustrated in FIG. 9. Current passing between a pair of confronting terminals and through the associated current-carrying point or segment of resistance material provides Joule heating thereof. As previously indicated, the size of each of the current-carrying points or segments in their longitudinal directions are of the order of magnitude preferably no more than about 14 micron and less desired no greater than about 20 micron. The overall length encompassed by the nine points or segments illustrated is no more and preferably less than about 175-200 micron, which may be the length of the tallest alpha-numeric character to be formed thereby. (Nine such points occupying 200 micron produces a resolution of 45 lines per millimeter. Utilizing fewer current-carrying points over a 200 micron distance lessens the sharpness of the alpha-numeric character produced. FIG. 9A shows the alphabet character "A" formed from different combinations of the successive energization of the current-carrying segments 6a-6i as the head 6 is moved across a given area of the microfiche card 5.

FIGS. 11 through 13 illustrate a modified form of the heating head 6. The modified heating head 6" thereshown comprises a series of resistance wire filaments 137, each of which, for example, may be no greater than about 12 microns in diameter and coated with a thin film of a suitable insulating material 138 of, for example, about 1 micron thick. A number of these resistance wire filaments are placed in abutting relation and stretched around the feathered straight edge 139a of an insulating substrate member 139. The wires then extend tightly around widely spaced positioning projections 139b on the opposite side faces of the substrate member 139 where the filaments then extend to more widely spaced terminals 140 where they are soldered or otherwise electrically and physically connected to the terminals. The resulting assembly is then potted in a suitable synthetic plastic resin 142. The resulting body may be ground away through the insulation 138 to expose the wire filaments along the edge 139a to form closely spaced Joule heat-radiating points like 6e", 6f", 6g", etc. (FIG. 13). The Joule heat-radiating points 6e", 6f", 6g", etc. as a unit look like a tiny speck and are flush with the outer face 142a of the resin body 142 so that the force applied to the heating head 6" is distributed over the outer surface of the microfiche card when the heating head is placed against the microfiche card.

When the heating heads 6 and 6" are used to provide a digital coded image on a particular heat-responsive recording medium (which would not generally be a microfiche card), high packing densities are achieved. Thus, packing densities as high and higher than a minimum desired 50 dots per millimeter are readily achieved with heating heads having the above stated dimensions.

FIG. 10 illustrates the electrical readout head 91 which scans a selected microfiche card frame during electrical readout of recorded data. As illustrated, it comprises a suitable support body 140 through which extend optic filaments 143a, 143b, ... 143i spaced similarly to the various current-carrying or Joule-heat radiating points of the heating heads 6 and 6". These optic filaments extend and pass light to suitable photo-electric devices, such as photodiodes, each of which develops a signal when significant light appears on the associated filament.

Refer now to FIGS. 14A and 14B which together form an overall exemplary block diagram of a control circuit for the various electrically controlled portions of the apparatus just described in connection with FIGS. 1 through 13. In the first place, the particular operation desired to be performed by the data recording and retrieval apparatus described may be initially determined by operating selected controls 140 mounted on the control panel 10 next to the typewriter keys K1 through K44, some of these controls, such as the microfiche positioning controls 150b, 150c, and 150d, are momentarily depressible switch operating pushbuttons, while the other controls, like controls 150a, 150e, 150f, 150g, 150h, 150i, 150j, 150k, 150m, 150n, and 150p, may be two position switch controls which remain in either of two positions to which they are manually operated. (Obviously, these controls can all be momentarily manually depressible or stable multi-position controls, if desired.) If it is desired to load a microfiche card into the slot 13 of the microfiche carriage, recording and readout unit 12, a microfiche loading pushbutton 150d is momentarily depressed to atuomatically effect the movement of the microfiche carriage and the support frame to its loading position shown in FIG. 2. (The same positioning of the carriage 15 and the frame 13 may be accomplished by operating manually operable control wheel 75 and 81, as previously described.) In any event, when the carriage 15 and the frame 13 are in their loading position, this fact may be indicated by suitable indicia in the window 19 on the front panel 16 of the microfiche carriage, recording and readout unit 12.

The operation of the various controls 150a-150p described results in signals fed to what may be a conventional data processor 158 for receiving and storing data and function signals and generating control signals in accordance with conventional computer technology. Such a data processor may have stored instructions (software) for responding to the signals like those generated by depression of the microfiche card positioning controls 150b, 150c, and 150d. To this end, the data processor 158 may include forward and backward pulse counters to keep track of the pulses which were previously fed to the X and Y axis carriage and frame position pulse motors 72 and 74, and means for generating gate openings signals of the proper duration for returning the carriage and frame to a position selected by depression of the carriage and frame positioning pushbutton 150b, 150c and 150d. Thus, as shown in FIG. 14A, control lines 160 and 160' extend from the data processor 158 respectively to X and Y axis position control gates 162 and 162' whose inputs are connected to a continuously operating pulse generator 164. The outputs of the gates 162-162' extend respectively through output lines 166-166' to the inputs of pairs of steering gates 168-170 and 168'-170' which control the feeding of motor stepping pulses to the "move-right" and "move-left" inputs 74a-74b of the X axis carriage pulse motor 74, and the "move-foward" and "move-rearward" inputs 72a-72b of the Y axis frame pulse motor 72. Control lines 172-172' also extend from the data processor 158 to the steering gates 168 and 168', respectively, to control which of the gates 168 or 170 and 168' or 170' are opened to pass the pulses to the appropriate inputs of the associated pulse motors 74 and 72.

When the microfiche loading pushbutton 150d is depressed, contacts 154 close to place ground potential on a line 156 extending to data processor 158. The data processor then generates the appropriate control signals to the control gates 162-162' and steering gates 168-168' to cause the X axis and Y axis positioning motors 74 and 72 to move the carriage 15 and frame 13 to a proper position to receive the microfiche card inserted through the slot 13. (Although now shown, the carriage 15 and frame 13 could be returned to their loading positions with the aid of limit switches, not shown, which effect the termination of the feeding of pulses to the Y and X axis pulse motors 74 and 72.)

When it is desired to position the inserted microfiche card opposite the recording and readout station 94, row selection pushbutton 150b is depressed momentarily which results in the closure of contacts 155 which provides ground potential to a line 157 extending to the data processor 158 which then conditions the data processor to receive signals identifying one of the alphabet characters A to H associated with the row of frames in which the selected frame is located. These signals are generated by depressing the appropriate ones of the keys K1-K45. This results in control signals fed from the data processor to the input line 160' extending to the Y axis frame control gate 162' so that the gate is opened the proper length of time to pulse the Y axis pulse motor 72 to move the microfiche support frame 13 the proper distance and in the proper direction to position the selected row of microfiche card frames at the recording and readout station 94. When the column selection pushbutton 150c is depressed, contacts 161 close to couple ground to input line 163 extending to the data processor 158. The data processor is then conditioned to receive any of the numbers 1-14 represented by the next two number keys in the group of keys K1-K45 which are depressed. This causes a control signal of proper duration to be generated on the control line 160 to open the X axis carriage control gate 162 the proper interval to effect the feeding of pulses to the proper input of the X axis pulse motor 74 to position the selected column of the microfiche card 5 opposite the recording and readout station 94. As previously indicated, the particular frame of the microfiche card which is in position opposite the recording and readout station is indicated in the indicator window 19.

After the desired frame of the microfiche card has been positioned opposite the recording and readout station, the operator operates controls 150, depending upon the type of recording or readout operation desired. For example, if alpha-numeric information is to be recorded by the depression of the keys K1-K45 and the character spacing and line spacing keys K45-K51, he may operate manually operable control 150a which is cathode ray tube on-off control. When this control is moved to its "on" position, a switch 174 closes to connect ground to one terminal of a relay Ra whose other terminal is connected by conductor 176 a source of energizing voltage, which is illustrated as the ungrounded terminal of a source of DC voltage 178 whose opposite terminal is grounded. The energization of the relay Ra closes a set of normally-open contacts Ra-1 which connects power from a power bus 180 to a cathode ray tube unit 182 which includes the aforementioned cathode ray tube 9. The data processor 158 then feeds suitable sweep synchronizing pulses and video pulses to provide the proper display on the face of the cathode ray tube 9 in response to the operation of the typewriter keys K1-K44 and K45-K51 in the manner of conventional alpha-numeric readout techniques used in computer systems and typewriter word processors.

When the alpha-numeric character keys K1-K45 and character spacing keys of the group of keys K45-K51 are operated in the manner of a conventional typewriter, the data processor 158 obtains access to the appropriate address or stages of an alpha-numeric pattern storage unit 194 corresponding to the particular keys depressed and feeds the appropriate pattern of head energizing markers to the proper sections of the pattern shift registers 187 which will develop the particular alphabet character or number involved when fed in proper sequence to the various current-carrying points or segments of the micro-sized or full sized heating heads 6 and 6'. The pattern shift registers 187 may have a different shift register section for each line of data which can be recorded in a particular microfiche frame. (Titling information which is to be recorded in full size on the marginal portion 7 of a microfiche card may be stored in the shift register section assigned to line No. 1 of a selected microfiche frame when alpha-numeric size reductions are desired or in a separate section assigned thereto.) In each pattern shift register section there may be nine individual pattern shift register units each assigned to a different one of the nine current-carrying points of the heating head and thus each such section has nine outputs.

Once the operation of the various character and spacing keys is completed, there are heating head markers in the various sections of the shift register which form patterns of energizing markers equivalent to that of the characters to be developed by the individual current-carrying points or segments of the heating heads referred to. At the appropriate time, these markers are fed out to nine common output lines 191a, 191b, ... 191i of the pattern shift registers on a section by section (or line by line) sequence. The markers forming an alphabet or numeric character stored in the corresponding character stages of shift register section are automatically erased and replaced by a new character upon the depression of a particular alphabet or numeric typewriter-like key in accordance with computer techniques commonly used in word process When the operator desires recording of the heating head energizing markers stored in the pattern shift registers 187, he operates either the controls 150g or 150h respectively provided for producing the recording of full sized and 24 to 1 reduced characters on the portion of the microfiche card involved after positioning the desired head 6 or 6' opposite the recording and readout station 94. Operation of the full sized record control 150g to a record position will cause closure of contacts 196 and 198. Closure of contacts 198 feeds ground to one of the terminals of a relay Rb connected to the aforementioned positive DC voltage bus 176. Energization of the relay Rb results in the closure of contacts Rb-1, Rb-2, ... Rb-9 (see FIG. 14B) connected between input lines 200a, 200b, ... 200i and the full sized heating head driver circuit 202 which is a 9-channel amplifier with individual outputs extending to the various current-carrying segments 6a', 6b', ... 6i' thereof. The input lines 200a, 200b, ... 200i respectively are connected to the nine outputs of the pattern shift register 187 so that when the pattern shift registers receive shift pulses on its shift line 189 the pattern of markers in the shift registers will be transferred in proper sequence to the circuit 202 which, in turn, is connected to the nine current-carrying points or segments of the full sized heating head 6'.

The closure of the contacts 196 couples ground to a line 204 extending to the data processor 158 which then feeds shift pulses to the various pattern shift register sections on lines 189a, 189b, ... 189i. As previously indicated, the full sized heating head 6' remains stationary so that the spacing of the characters recorded by the full sized heating head 6' on the marginal portion of the microfiche card 5 is controlled by movement of the microfiche card relative to the heating head 6', rather than the movement of the heating head relative to the microfiche card, as in the case of recording by the micro-sized heating head. The data processor 158 feeds the necessary gate control signals to the X and Y axis control gates 162-162' and the associated steering gates 168-170 and 168'-170' for this purpose in synchronism with the feeding of shift pulses to the shift registers 187.

The control 150h is operated to its "record" position when a 24 to 1 reduction of alpha-numeric characters is desired. This closes contacts 205 to couple ground to one terminal of a relay Rc connected to bus 176 and closes contacts 207 to couple ground to a conductor 209 extending to the data processor 158. The resulting energization of relay Rc effects closure of contacts Rc-1, Rc-2, ... Rc-9 (FIG. 14B) connected between the output lines of the pattern shift registers 187 and the micro-sized heating head driver circuit 206 coupled to the various current-carrying points of the micro-sized heating head 6. Energization of the relay Rc also effects closure of contacts Rc-10 between the X axis heating head motor 114 and power bus 180. Energization of the X axis motor 114 will initiate the generation of synchronizing pulses by the passage of a spot 211 on the shaft 116 of the motor by a synchronizing signal generating photocell 208. The pulses produced by the synchronizing signal generating photocell 208 appear on the output line 212 extending to the data processor 158. The data processor, in turn, feeds this pulse or an internally generated synchronizing signal on a line 212 to synchronize the generation of the pulses by the pulse generator 164 and also controls the timing of pulses fed to the shift pulse lines of the pattern shift registers 187, so that the micro-sized heating head 6 receives energizing markers at the appropriate time after the micro-sized heating head returns to the beginning of a line position to initiate the recording of a new line of information therein. During the time that the micro-sized heating head 6 is returning to the beginning of a line where it is not to receive any information, the synchronizing pulse generated on the line 212 also assures a delay in the receiving of information from the pattern shift registers 187 until the head has returned to the beginning of a line. The pulse produced in the photocell 208 should occur at the point where the head has reached the end of a line position. For similar reasons, in order to ensure proper return of and positioning of the heating head 6 at the beginning of the first line of a selected microfiche card frame before information is fed from the line 1 section of the pattern shift registers 187, there are provided upper and lower limit switches LS-1 and LS-2 which are respectively operated when the recording and electrical readout head carrying frame structure 102 reaches its opposite extremes of position defining the margins of a microfiche card frame. When the lower limit switch LS-2 is operated, a signal appears on a line 220 extending to the data processor 158 which results in the generation of a gate opening pulse on control line 222 extending to the Y axis head motor control gate 217 which receives input pulses from the pulse generator 164. Line 219 extending from the output of gate 217 connects to the input of steering gates 221-223 whose outputs respectively are connected by lines 225 and 227 to the inputs 100a and 100b of the Y axis head pulse motor 100. A gate opening signal is also fed from the data processor 158 along control line 229 to open the gate 221 or 223 wherein pulses are fed from the pulse generator 164 through the gate 217 and the steering gate 221 or 223 which will feed pulses to the input of the Y axis head pulse motor 100 which returns the heating head 6 to the first line of selected microfiche frame. When the head is returned to this initial line, the upper limit switch LS-1 will be operated to place a signal on a control line 216 extending to the input of the data processor 158, so that the shift pulses to the pattern shift registers 187 can begin to initiate a new recording of information on the selected microfiche card frame. Also, the data processor 158 then reverses the states of steering gates 221 and 223 so that the Y axis head stepping motor will reverse its direction of intermittent rotation.

When all of the data stored in the pattern shift registers has been previously recorded in a manner desired, to erase all of this data from the pattern shift registers erase control 150f may be operated which closes contacts 184 to couple ground to an input line 186 extending to the data processor 158, which then carries out the necessary erase operation of the markers in the pattern shift registers (and in the 4-bit analog data shift register 272 to be described). The subsequent operation of the keys K1-K44 and K45-K51 refill the pattern shift registers 187 with markers in the manner previously described.

If it is desired simultaneously to prepare hard copy as the 24 to 1 alpha-numeric recording is being carried out on a microfiche card frame, then the operator operates an external printer on-off control 150i. This results in closure of contacts 240 which couples ground to one terminal of a relay Rd connected to bus 176 to energize the same. When the relay Rd is energized, contacts Rd-1 extending between the power bus 180 and the external printer 20 closes to prepare the printer 20 for operation when it receives signals on one or more input lines 242 to control the printing and spacing operations performed by the printer 20 in accordance with signals fed thereto from the data processor 158.

If it is desired to provide a visual readout of a particular microfiche frame previously recorded upon and in position opposite the recording and readout station 94, a visual readout control 150k is operated which results in the closure of contacts 240 which grounds one terminal connector of the relay Rf connected to bus 176. The resulting energization of relay Rf results in the closure of contacts Rf-1 which feeds ground potential to one terminal of the projection lamp 126 whose other terminal is coupled to the power bus 180. This causes the back-lighting of the selected microfiche card frame which is projected in magnified form upon the projection screen 3.

When it is desired to have an electrical readout by the scanning of the light projected image of the selected microfiche card frame by the electrical readout head 91, after the head carrying frame is moved opposite the recording and readout station, the electrical readout control 150j is operated to its "on" position, which results in the closure of contacts 242 which provide ground potential to one of the terminals of a relay Re connected to line 176. The resultant energization of relay Re results in the closure of contacts Re-1 which applies ground potential to one of the terminals of the projection lamp 126 which energizes the same. Also, contacts Re-2 close to couple the power bus 180 to the X axis head motor 114, and contacts Re-3 close to couple ground potential to one terminal of the aforementioned solenoid 111 connected to the power bus 180, so that the electrical readout head 91 will be brought in close but preferably spaced relation to the selected microfiche card frame involved. The scanning of the projected image by the electrical readout head will generate signals in photodiodes 244a, 244b, ... 244i extending to amplifiers 246. The outputs of the amplifiers are fed along various lines 248 which may extend directly to electrical output terminals for feeding to external output devices or circuits, or to the data processor 158 through lines 248 as indicated in FIG. 14A. The data processor has output lines extending to a number of electrical output terminals 252. The nature of the signals fed to the output lines 252 by data processor 158 may be the same as or different from the 9-bit signals fed from the amplifiers 246. In the latter case, the data processor 158 includes decoder sections for decoding information and feeding desired signals to the output terminals 252 for connection to desired output circuits or external devices.

As previously indicated, the present invention is useful in recording binary or analog signal data in addition to alpha-numeric data. FIG. 14A illustrates a source of binary signals 256 and a source of analog signals 258. The control panel 10 contains controls 150m and 150n which when respectively operated close switches 256' and 258' which couple the signal sources respectively to lines 264 and 266 leading to the data processor 158. When binary signals are involved, the data processor feeds signals to the pattern shift registers 187 to establish a pattern of markers therein to be fed ultimately to the micro-sized heating head 6 when a data transfer operation is called for by operation of a control 150e. When the control 150e is operated, contacts 282 close to feed ground to a line 284 extending to data processor 158. The data processor then sends the necessary gate control signals to the Y axis head control gate 217 and to the associated steering gates 221 and 223 and to the shift inputs of pattern shift registers 187 properly to synchronize the feeding of signals from the pattern shift registers 187 to the micro-sized heating head 6 in a manner similar to that previously explained. Instead of using a microfiche card with individual frames, another recording medium format may be used, similar to that used in magnetic tape or discs, but made of the same heat responsive material as microfiche card 5. In such case, where the heating head will scan areas larger than a microfiche card frame, a separate binary data recording and scanning head assembly would be provided.

As previously indicated, the recording of binary data by a micro-sized heating head on suitable heat-responsive recording media of the type having archival properties and the high data packing density resulting therefrom produces binary data records which can replace presently available flexible magnetic discs, magnetic cartridge and other similar magnetic data storage media used in computer systems and the like at substantial cost savings. The cost savings are primarily a function of the cost of the recording media. The cost of manufacturing quality magnetic materials is many times that of the cost of fabricating heat-responsive films of the type most advantageously used in the data retrieval recording systems of the present invention.

When pictorial data having gray scale is to be recorded on a microfiche card 5, analog signals, for example, facsimile recorder signals, are fed to the data processor 158 which develop binary signals fed to binary code storage, such as 4-bit, data shift pattern registers 72 having a separate section for each current-carrying point or segment of the micro-sized heating head to be used. The binary coded data stored in each section identifies the intensity of the transparent or opaque images to be recorded sequentially by the feeding of current to the associated current-carrying point of the micro-sized heating head 6. The data processor includes decoding means for measuring the amplitudes of the analog signals fed successively thereto, and transferring the binary coded data stored in an analog storage unit 270 indicative of these amplitudes to the appropriate stages of the section of the shift registers 272 assigned to the current-carrying point which is to record the data involved.

Each section of the analog data shift registers 272 thus stores patterns of binary coded data corresponding to the pattern of images to be recorded and indicating the intensity of the current to be fed to the associated current-carrying point of the micro-sized heating head 6. Thus, nine groups of lines 276a, 276b, ... 276i extend from the different sections of the analog data shift registers 272 to corresponding digital to analog converters 278a ... 278i (FIG. 14B). These converters are decoding circuits which couple one of a number of different DC voltage outputs of a drive voltage source 280, wich may merely be a tapped resistor connected to a DC voltage source, indicative of the different possible gray scale levels involved. Thus, the current fed to each current-carrying point of the heating head 6 will have a value proportional to the number which the binary coded data fed from the associated section of the shift registers 272 represents. To record such data, a control 150p is operated which closes contacts 268 which applies ground to one side of a relay Rg connected to bus 176. The resultant energization of relay Rg closes contacts R9-1 to 9 (FIG. 14B) which connect the respective outputs of the digital to analog converters 278a ... 278i respectively to the nine current-carrying points of the micro-sized heating head 6.

As previously indicated, the nature of the heat-responsive recording medium is important in obtaining good microfilm imaging and especially where alpha-numeric or pictorial data is recorded for subsequent projection onto a screen. Thus the reading of alpha-numeric characters on a projection screen is facilitated by high resolution obtained by the small dot images produced on the recording medium. Also, the clearest projected images are obtained by projecting light through the recording medium in comparison to viewing light reflected from the surface of the recording medium. For this reason, it is most advantageous that the heat-responsive recording media used in the alpha-numeric data recording applications of the invention produce a pattern of transparent and opaque images so that light can be projected through the transparent portions thereof. To this end, and referring now more particularly to FIG. 15A, the heat-responsive recording medium used to make the microfiche card 5, most advantageously, may comprise a solid substrate 300 of a transparent synthetic plastic material which may be polyesters, particularly polyethylene terephthalates, like Mylar, which has a melting temperature of about 250° C. Upon one side of the substrate is deposited a thin film 302 of heat-responsive imaging material of the kind which is initially opaque or transparent (but preferably initially opaque) and becomes transparent or opaque when heat above a given predetermined value is fed thereto or developed therein. There is preferably applied to the outer surface of the imaging layer 302 a transparent protective layer 304 made of any suitable transparent synthetic polymeric material, such as polyurethane, polyvinylidine chloride or silicone resin, such as Dow Corning R-4-3117.

The heat-responsive imaging material which constitutes the imaging layer 302 may comprise a transparent film, like the diazotype, the vesicular-type, or dry silver-type films modified to be insensitive to light and highly sensitive to heat, and resettable amorphous calcogenide films disclosed in U.S. Pat. No. 3,530,441. The imaging layer 302 may also be organo-metallic films like those disclosed in U.S. Pat. Nos. 4,142,896, 4,066,460 and U.S. application Ser. No. 596,617 filed July 17, 1970, now abandoned. The preferred type of heat-responsive recording medium when they are utilized with appropriate small thicknesses as described, is the initially opaque type of films disclosed in U.S. Pat. No. 4,267,261. The preferred film applied to the substantially transparent substrate is a solid, high optical density and substantially opaque film of a dispersion imaging material, which upon application thereto of Joule heat energy above a certain critical value, changes to a substantially fluid state in which the surface tension of the material acts to cause a substantially opaque film subjected to the heat energy to disperse and change to a discontinuous film comprising openings and deformed material which are frozen in place following the application of heat energy.

It is believed, that the most sharply easily projectable images are provided using a heat-responsive recording medium where the imaging layer 302 is a thin opaque film. Accordingly, the most preferred type of heat-responsive recording medium is the type disclosed in U.S. Application Ser. No. 577,003 (now U.S. Pat. No. 4,267,261, filed May 13, 1975 and entitled Method for Full Format Imaging. FIGS. 15A-15B illustrates the type of recording films disclosed in this application where the imaging layer 302 is made of any material which has the capacity of dispersing by forming small globules or other small particles or small structures on a given substrate. The dispersion imaging materials include metals as well as electrical semiconductors (i.e. materials having an electrical conductivity of from $10^{-13}$ to $10^3$ ohm$^{-1}$cm$^{-1}$) and electric non-conductors such as various organic compounds. It was found that particularly useful are metals having a relatively low melting point, such as bismuth or the like, preferably a bismuth alloy which melts at a temperature no greater than about 150°-250° C. Among the class of semiconductor materials some are more brittle than metals. This brittleness can in some cases favor dispersion. Most preferred among these semiconductor materials is tellurium.

Since it takes a finite time for a heated current-carrying point of the heating head 6 or 6" to cool after it is initially heated by Joule heating, the maximum scanning speeds and best resolution is generally achieved by minimizing the temperature at which the current-carrying points of the heating heads is to be raised to produce imaging in the recording medium. Also, when the recording medium includes, in addition to an imaging layer, a substrate like substrate 300 and a protective layer like layer 304 as shown in FIG. 15A, it is desirable that the softening or flow temperatures of the substrate and protective layers are higher than the temperature to which the imaging layer 302 must be raised to obtain effective imaging. If, for example, the imaging layer, must be raised to a temperature, for example, of 300° C. to produce effective imaging, the aforementioned polyester substrate material which has a melting temperature of about 250° C. would be less desirable. In such case, for example, the substrate could be a higher melting point material like the polyimide Kapton, sold by the Dupont Corporation, which has a zero strength temperature of about 815° C. In any event, the preferable imaging layer material is one having a low melting point like bismuth or bismuth alloys of the type to be described.

Another desirable property of the dispersion imaging material is that is has at or above its melting or softening point and at the imaging temperature reached a viscosity which is low enough to permit its flowing together into small droplets, globules or similar structures sufficiently to form selected transmissive areas. At the same time the material should preferably also have a relatively high surface tension, when it is in the molten or softened state, to promote droplet or globule formation. Furthermore, a particular selected dispersion imaging material must also have a low wettability for the particular substrate, whereon it is to be used. If the wettability of the dispersion imaging material for its substrate is too large, insufficient dispersion and poor images may result.

Of great importance is that the dispersion imaging material in its undispersed state is highly opaque. If it does not have the required high opacity in its deposited film state, as is the case in some of the otherwise suitable organic and inorganic materials, opacity may be produced by adding organic dyes or very finely particulate pigment materials such as carbon black and the like.

Images produced by the imaging materials referred to have as high a resolution and as good a definition as can be produced by the use of a suitable highly opaque dispersion imaging material, the images show high contrast even at minimal thicknesses of the film of dispersion imaging material, such as thicknesses of 0.2 micron and less.

Generally, materials which have melting or softening points in the range from about 50° C. to about 500° C., but preferably no higher than about 250° C., a viscosity at or above the melting or softening point in the range from about $10^{-2}$ poises to about $10^5$ poises, a thermal conductivity of from $$10^{-4} \frac{cal \cdot cm}{cm^2 \cdot s \cdot deg \cdot C.} \text{ to } 10^{-1} \frac{cal \cdot cm}{cm^2 \cdot s \cdot deg \cdot C.}$$

and a surface tension in the softened or molten state of from 50 to 1000 dyns/cm are generally suitable dispersion imaging materials for use as the imaging layer 302.

The layer or film of dispersion imaging material may be provided on the substrate of any convenient means, for instance by thermal evaporation and deposition in vacuum, by sputtering, by application in form of a solution with subsequent evaporation of the solvent and so forth.

In a high contrast film application where gray scale is not needed, when current is applied to the current-carrying point of the heating head 6 or 6'' overlying the recording medium to produce Joule heat above a given value, heat transmitted to the imaging layer 302 through the protective layer 304 will result in the dispersion of the imaging layer material receiving heat above this value which forms small globules 306 shown in FIG. 15B. These globules adhere to the substrate so that when the heat generated in the current-carrying point involved terminates, these globules cool and solidify. The globules have a very small size, for example, of the order of magnitude of 1 micron and less, and are spaced from each other by such a considerable relative distance that the general region effected by the current-carrying point or segment effectively appears as a single transparent point when light is transmitted therethrough.

Where a varying degree of opaqueness or transparency is needed, the imaging layer 302 has a dispersion varying means incorporated therein which is effective to a degree proportional to the temperature of the layer so it acts in a manner like or equivalent to that illustrated in FIGS. 16A-16C to which reference is now made. When the film shown in FIGS. 16A-16C is subjected to heat, the size and/or the number of globules produced becomes a function of the degree of Joule heat applied thereto so that the total area of the spaces or holes between the globules varies with the degree of Joule heating involved. Thus, a relatively small amount of heat produces globules 302a shown in FIG. 16A where there is a slight separation between the globules. A higher degree of heat will cause greater separation of the globules 302b shown in FIG. 16B. The maximum amount of heat to which the recording medium variably responds produces the wide separation of globules 302c shown in FIG. 16C like that produced for the high contrast type of recording medium shown in FIGS. 15A and 15B.

For a high contrast film, the imaging layer preferably includes bismuth combined with either or both lead and tin. For example a composition of 60% by weight of bismuth, 20% by weight of lead and 20% by weight of tin makes a particularly desirable high contrast imaging layer. Also, other compositions that are useful is a composition of 80% by weight of bismuth, 10% by weight of lead, 10% by weight of tin, and a composition of 70% by weight of bismuth, 20% by weight of lead and 10% by weight of tin.

One exemplary process for forming an imaging layer with the above-identified compositions is to mix the desirable percentages of the different elements in a quartz tube (such as 60 grams of bismuth, 20 grams of lead and 20 grams of tin), heat the same until melting, mix by shaking, and then cast the same on a glass plate. The resultant mixture is then pulverized in a mortar and 25 grams of pulverized material is placed in an evaporation boat in a vacuum deposition machine where the vacuum chamber is evacuated to about $10^{-6}$ torr. The composition involved is evaporated onto the substrate involved, which may be the aforementioned polyester resin substrate extending along a water cooled substrate holder so that the substrate is relatively cool (e.g. below about 80° C.), by placing the boat approximately 4.5 inches below the substrate with a glass cylindrical 4.5 inch diameter chimney extending between the boat and the substrate, and heating the boat to vaporize the alloy composition. For best results, about 10 grams of silicon monoxide placed in a separate evaporation boat below the chimney is heated to vapor deposit the silicon monoxide upon the alloy layer. A preferable optical density range of the film, which is controlled by the amount of evaporated material, is about 1.0–2.5. The alloy layer is then coated preferably with a suitable transparent protective material, as previously described. In the alternative, if a special formating of the recording medium is desired, such as when it is desired to form a microfiche card where the areas thereof surrounding each initially opaque frame are to be initially transparent, a photo-resist coating sensitive to ultraviolet light or the like is applied as the protective coating. (This photo-resist coating may be the KPR-4 photo-resist manufactured by Eastman Kodak Company, which is a polyvinylcinnamate). The coating is then subjected to ultraviolet light passed through a mask in those areas in which it is desired the opaque film to remain (such as the frame-forming areas of the microfiche card 5) and the other areas of the film are then etched away by suitable processing chemicals. The areas of the photo-resist struck by the ultraviolet light are unaffected by the etchant. If it is not desired to etch away any part of the opaque film, then the other aforementioned protective coatings are preferred.

If it is desired to produce a gray scale film, the imaging layer is formed by composition wherein the rollback of the dispersion material is impeded to a degree depending upon the temperature to which the imaging material is heated, as previously explained. For this application, the imaging layer may comprise a composition of 70% by weight of bismuth and 30% by weight of lead applied to the substrate in the same manner described above.

The bismuth alloy films like those described above may be imaged by the heating head 6" shown in FIGS. 11 through 13 comprising 12 micron diameter resistance wire filaments having a resistivity of 15 ohms per millimeter. Satisfactory transparent dot images were formed with a current flow of 150 milliamps through any selected resistance wire filament. The areas of the filaments exposed to form the Joule heating-producing points of the heating head were approximately 12 micron square segments.

It should be understood that numerous modifications may be made in the various preferred forms of the invention described without deviating from the broader aspects of the invention. For example, while for many aspects of the invention it is important that the energy which images the recording medium comprise Joule energy applied by a heating head as described, other aspects of the invention are not to be so limited, except as specified in the claims.

We claim:

1. A recording system for producing microform records, said system comprising: recording means positioned to image selected micro-sized points of an imageable recording material, said recording means including exposed micro-sized dot image-forming points and having electrical signal input terminals adapted to receive electrical image-producing signals for rendering selected ones of said points effective to image said recording material at the points of said recording material confronting the same to provide a desired image pattern on the recording material, the size of each of said micro-sized image-forming points being no greater than about 20 micron and being spaced apart along center points to provide a dot image resolution of at least about 50 dots per millimeter, and operating means for selectively feeding said electrical image-producing signals to said recording means.

2. The recording system of claim 1 combined with said recording material which is an initially opaque or transparent dry process film which is sensitive to and is imaged and developed by application of heat energy transmitted by said image-forming points of said recording means to selected points thereof to produce a pattern of micro-sized light transparent or opaque dot images corresponding to the energized portions thereof, which enables visual light to be transmitted through the film in accordance with the pattern of transparent areas thereon.

3. The recording system of claim 1 or 2 wherein said operating means effects the formation of alpha-numeric characters or the like upon said recording material.

4. The recording system of claim 1 wherein said operating means effects the recording on said recording material of very closely spaced dots representing digital coded information.

5. The recording system of claim 1 wherein the intensity of the dot image to be produced in said recording material by each image-forming point varies with the magnitude of the heat supplied thereto which varies with the magnitude of the signal fed to the associated signal input terminal, and said operating means includes means for selectively feeding signals to a selected input terminal which can be any one of a number of predetermined magnitudes to produce a dot image of corresponding intensity.

6. The recording system of claim 1 wherein said operating means include depressible alphabet, numeric and line spacing keys for producing properly spaced alphabet or numeric images on said recording material.

7. The recording system of claim 6 wherein said image-forming points encompass an area less than the area of the recording material to be recorded upon, and said operating means includes means which support at least one of said recording material and recording means, for relative movement with respect to the other, so that said recording means scans said film horizontally progressively for a distance of one character width each time an alphabet or numeric key is depressed and vertically for a distance equal to a line spacing distance each time a line spacing key is depressed, said image-forming means effecting the feeding of electrical signals to the proper image-forming points of said recording means following the depression of an alphabet or numeric character key to produce a pattern of dot images in accordance with the character key depressed.

8. The recording system of claim 1 where said operating means includes a typewriter station for an office or the like, with a typewriter-like keyboard having keys for the various alphabet and numeric characters and punctuating symbols; manually operable forward and backward character and symbol spacing controls; manually operable up and down line spacing controls; data storage means responsive to said keys and controls for storing information to be recorded corresponding to the operated ones of said keys and controls, the recording of a character symbol or space data at a given address of said data storage means automatically replacing the previous character symbol or space data thereat; means for producing a succession of data indicating electrical signals from the data stored in said data storage means, which signals represent the various lines of alphabet and/or numeric characters and punctuating symbols to be recorded and reproduced for human reading; manually operable transfer control means for generating said electrical signals in succession from the data stored in said data storage means; visual display means responsive to the operation of said various character and punctuating keys, forward and backward character and symbol spacing controls and said up and down spacing controls for making a temporary visual presentation of the information to be recorded and reproduced as the data involved is being developed by operation of said keys; positioning and image-forming means responsive to the operation of said transfer control means and to said data indicating electrical signals generated following the operation thereof for moving said recording means and said recording material relative to the other and for effecting the feeding of signals representing decoded alphabet-numeric and punctuating indicating signals to selected ones of said image-forming points of said recording means at selected instants of time to reproduce the desired characters and punctuating symbols.

9. The recording system of claim 1 wherein said recording means is carried on support means, said support means also supports image projection means for projecting an image recorded on said recording means onto a projection screen or the like, and means for moving said support means selectively to bring said projection means or said recording means in position opposite the portion of the recording material upon which data is to be recorded or upon which data has already been recorded.

10. The recording system of claim 2 wherein said operating means includes a support frame for said recording material, said frame having an outer wall upon which said recording material in sheet-like form can be supported, said wall being made of transparent material to permit light to project through the wall and the recording material supported thereon, a projection lamp, magnifying lens, and means for relating said transparent frame, projection lamp and magnifying means so that the recorded upon portion of the material supported upon the frame is positioned between said projection lamp and said magnifying lens so that the image produced on said material is projected through said magnifying means, and means for displaying the image magnified by said magnifying lens upon a projection screen or the like.

11. The recording system of claim 1 wherein said operating means includes a source of sequentially generated alpha-numeric or picture-producing electrical data input signals and control means responsive to said data input signals for causing said image-forming points of said recording means to direct successively against progressively varying portions of said recording material patterns of image-producing energy corresponding to the alpha-numeric or picture-producing data represented by said data input signals, said image-forming points of said recording means are capable of producing patterns of said given energy of at least two widely different sizes, at least one of which different sizes produces in said recording material alpha-numeric or pictorial forming dot images of such minute size as not to be readily discernible without image magnifications, and pattern size selection control means for operating said recording means selectively to produce either one of said energy pattern sized upon said layer of imaging material.

12. The recording system of claim 10 wherein the other of said pattern sizes produces in said recording material alpha-numeric or pictorial images of relatively large size as to be readily discernible without image magnification.

13. The recording system of claim 12 combined with said recording material which has individual frames in which the reduced sized data images are to be recorded, and a title-receiving portion for receiving said alpha-numeric images of a size readily discernible without image magnification, said operating means includes positioning means for relatively positioning said recording means opposite said title-receiving portion of said recording material to produce said relatively large sized alpha-numeric data images thereon and for relatively positioning said recording means opposite a selected frame of said recording material to produce said minutely sized alpha-numeric or pictorial images thereon.

14. The recording system of claim 11 wherein said recording means includes first and second groups of differently spaced and sized and selectively energizable image-forming points for producing dot image-forming patterns of different sizes.

15. The recording system of claim 14 combined with said recording material which has individual frames in which reduced sized data images are to be recorded and a title-receiving portion for receiving relatively large size alpha-numeric data, said operating means includes positioning means for relatively positioning said second group of image-forming points to produce said relatively large size alpha-numeric data images opposite said title-receiving portion of said recording material and for relatively positioning said first group of imaging-forming points opposite a selected frame of said recording material to produce said minutely sized alpha-numeric or pictorial images thereon.

16. The recording system of claim 3 combined with said recording material and a separate recording medium upon which relatively large sized alpha-numeric or pictorial data is to be displayed which is readily discernible without image magnification, said operating means including means for forming on said separate recording medium said relatively large sized data corresponding to the data recorded in reduced size on a selected frame of said recording material.

17. The recording system of claim 2 wherein there is provided data retrieval means comprising image projecting means for directing light against a selected frame of said recording material and for projecting the resulting light images in magnified form on a projection surface, and electric readout means responsive to the images formed from said recording material for generating electrical signals representing the data recorded thereon.

18. The recording system of claim 15 wherein said operating means includes a support frame having an outer wall upon which said recording material in sheet-like form can be supported, said wall being made of transparent material to permit light to project through the wall and the recording material supported thereon, a stationary projection lamp, a magnifying lens, and means for relating said transparent frame, projection lamp and magnifying lens so that the recorded upon portion of the material supported upon the frame is positioned between said projection lamp and said magnifying means so that the image produced on said material is projected through said magnifying lens upon a projection screen or the like.

19. A recording device for producing microform records, said device comprising: recording means positioned to image selected microsized points of an imageable recording material, said recording means including a plurality of exposed micro-sized joule heat energy dot image-forming spaced apart points each no greater than about 20 microns and in fixed relation to each other and having signal input terminals adapted to receive image-producing signals for rendering selected ones of said points effective to image said recording material at the points of said recording material confronting the same to provide a desired image pattern on the recording material, said recording means being carried on support means, image projection means distinct from said recording means also carried on said support means for projecting the entire image recorded by said recording means on the recording material, a projection screen contained by the device and positioned for receiving an image from said projection means, and means for moving said support means selectively to bring said projection means or said recording means in position opposite the portion of the recording material upon which data is to be recorded or upon which data has already been recorded.

20. The recording system of claim 19 combined with said recording material which is an initially opaque or transparent dry process film which is sensitive to and is imaged and developed by application of energy transmitted by said image-forming points of said recording means to selected points thereof to produce a pattern of micro-sized light transparent or opaque dot images corresponding to the energized portions thereof, which enables visual light to be transmitted through the film in accordance with the pattern of transparent areas thereon.

21. In a typewriter station for an office or the like comprising, in combination: a typewriter-like keyboard having keys for the various alphabet and numeric characters and punctuating symbols; manually operable forward and backward character and symbol spacing controls; manually operable up and down line spacing controls; data storage means responsive to said keys and controls for storing information to be recorded corresponding to the operated ones of said keys and controls, the recording of a character symbol or space data at a given address of said data storage means automatically replacing the previous character symbol or space data thereat; means for producing a succession of data indicating electrical signals from the data stored in said data storage means, which signals represent the various lines of alphabet and/or numeric characters and punctuating symbols to be recorded and reproduced for human reading; manually operable transfer control means for generating said electrical signals in succession from the data stored in said data storage means; visual display means responsive to the operation of said various character and punctuating keys, forward and backward character and symbol spacing controls and said up and down spacing controls for making a temporary visual presentation of the information to be recorded and re-produced as the data involved is being developed by operation of said keys; recording means having an array of individually selectively dot image heat-producing points, each of said dog-image heat-producing points having dimensions no greater than about 20 micron and being spaced apart no greater than about 20 microns; a dry process microform film supported adjacent to said recording means and including a layer of imaging material which is sensitive to and is imaged and developed by operated ones of said dot image heat-producing points to produce a pattern of visible transparent or opaque dot images corresponding to the operated ones of said points; and position and character-forming means responsive to the operation of said transfer control means and to said data indicating electrical signals generated following the operation thereof for moving one of said recording means and said microform film relative to the other and for effecting the feeding of signals representing said alphabet-numeric and punctuating indicating signals to selected ones of said dot image heat-producing points of said recording means at selected instants of time to reproduce in alphabet-numeric form said data.

22. Microform recording apparatus comprising, in combination, a recording station including means for supporting a recording medium which is sensitive to and is imaged and developed by the feeding of a given heat energy externally applied to its surface, recording means having a number of selectively operable micro-sized and spaced heat-producing points capable of imaging said recording medium over an area terminating in two orthogonal directions short of the entire area of the recording area to be imaged thereby and placeable adjacent said recording means and each having dimensions no greater than about 20 micron, support means for said recording means which support means is mounted for movement in two orthogonal directions wherein said micro-sized and spaced energy-producing points can scan the area of said recording medium on which images are to be produced while the recording medium remains stationary relative thereto, and means for moving said support means in said two orthogonal directions to scan said recording medium.

23. The microform recording apparatus of claim 22 wherein said recording medium is supported by supporting means for movement over said microform film, said microform film is in the form of a microfiche card or the like having spaced recording frames upon which data is to be recorded representing a page of alpha-numeric or pictorial data or information, said supporting means being mounted for movement to bring a selected frame of said microfiche card or the like opposite said recording means, and means for moving said supporting means to bring the selected frame of said microfiche card or the like opposite said means.

24. The microform recording apparatus of claim 22 wherein said support means also supports image projection means for projecting an image recorded on said microform film onto a projection screen or the like, and means for moving said support means selectively to bring said projection means or said recording means in position opposite the portion of the recording medium upon which data is to be recorded or upon which data has already been recorded.

25. A recording head to image selected microsized points of an imageable recording material, said recording head including exposed micro-sized Joule heat-producing points adapted to receive selectively heat image-producing signals and to image said recording material at the points thereof opposite a signal fed image-forming point of said recording head, the size of each of said micro-sized Joule heat-producing points being no greater than about 20 micron and being spaced apart along center points to provide a dot image resolution of at least about 50 dots per millimeter.

26. The recording head of claim 25 wherein said Joule heat-producing points on said recording head are spaced from one another and aligned in only one direction to produce a linear array of such points.

27. A dry process system for producing microform information records comprising, in combination, an initially opaque or transparent dry process film which is sensitive to and is imaged and developed by application of Joule heat energy applied to selected portions thereof by micro-sized heat image-producing points to produce a pattern of micro-sized light transparent or opaque dot images corresponding to the energized portions thereof, which enables visual light to be transmitted through the film in accordance with the pattern of transparent areas thereon; a recording unit mounted in contiguous relation to the outer surface of said film and having a number of micro-sized and spaced selectively operable Joule heat image-producing points each of a size no greater than about 20 micron, and said Joule heat-producing points being so closely spaced that dot images are produced on said film with a resolution of at least about 50 dots per millimeter; operating means for selectively feeding Joule heat-producing current to selected area of said Joule heat-producing points at selected times; and positioning means for moving one of said recording unit and film relative to the other to produce a desired pattern of dot images on said film at said resolution of at least about 50 dots per millimeter.

28. The dry-process apparatus of claim 27 wherein said Joule heat-producing points on said recording unit are spaced from one another and aligned in only one direction to produce a linear array of such points.

29. A recording head to image selected microsized points of an imageable recording material, said recording head including exposed micro-sized Joule heat-producing points adapted to receive selectively heat image-producing signals and to image said recording material at the points thereof opposite a signal fed image-forming point of said recording head, the size of each of said micro-sized Joule heat-producing points being no greater than about 20 microns.

30. A data recording device for recording information on a recording medium that includes a layer of imaging material which is imaged by applying energy to selected areas thereof to produce a visible image on the selected areas comprising a source of sequentially generated alpha-numeric or picture-producing electrical data input signals; imaging means and control means responsive to said imaging means to direct successively, against progressively varying portions of the layer of imaging material, dot image patterns of energy corresponding to the alpha-numeric or picture-producing data represented by said electrical data input signals, said imaging means having first and second recording heads, said first recording head for producing micro-sized dot patterned alpha-numeric or pictorial images representing at least a 24:1 size reduction relative to conventional type sizes, and the other recording head for producing relatively large images which are discernable without image magnification, said first recording head including a plurality of micro-sized Joule heat energy transmitting points in fixed relation to each other each about 20 microns or less in size, for producing said micro-sized dots on the recording material at points opposite said first recording head, and pattern size selection control means for selectively operating one of said recording heads to produce the corresponding energy pattern size upon the layer of imaging material.

31. The data recording system of claim 30 wherein there is provided data retrieval means comprising image projecting means for directing light against a selected frame of said recording medium and for projecting the resulting light images in magnified form on a projection surface, and electric readout means responsive to the images formed on a selected frame of said microfilm for generating electrical signals representing the data recorded thereon.

32. The data storage system of claim 30 wherein said recording medium has individual frames in which the reduced sized data images are to be recorded, and a title-receiving portion for receiving said alpha-numeric images of a size readily discernible without image magnification, said imaging means including positioning means for relatively positioning said imaging means opposite said title-receiving portion of said recording medium to produce said relatively large sized alpha-numeric data images thereon and for relatively positioning said imaging means opposite a selected frame of said recording medium to produce said minutely sized alpha-numeric or pictorial images thereon.

* * * * *

UNITED STATES PATENT AND TRADEMARK OFFICE
CERTIFICATE OF CORRECTION

PATENT NO. : 4,346,449

DATED : August 24, 1982

INVENTOR(S) : Stanford R. Ovshinsky et al.

It is certified that error appears in the above—identified patent and that said Letters Patent is hereby corrected as shown below:

Column 1, line 18, change "pattern" to --patterns--.
Column 3, line 55, change "afore-mentioned" to --aforementioned--.
Column 4, lines 27 and 28, change "achieveable" to --achievable--.
Column 5, line 52, change "and" to --an--.
Column 9, line 16, change "tilting" to --titling--.
Column 11, line 22, change "89" to --89a--.
Column 13, line 16, after "6" insert --is--.
Column 15, line 26, change "atuomatically" to --automatically--.
Column 15, line 50, change "openings" to --opening--.
Column 17, line 46, change "process" to --processors.--.
Column 21, line 34, change "wich" to --which--.
Column 22, line 17, change "diazotype" to --diazo-type--.
Column 22, line 45, after "4,267,261" insert --)--.

UNITED STATES PATENT AND TRADEMARK OFFICE
CERTIFICATE OF CORRECTION

PATENT NO. : 4,346,449
DATED : August 24, 1982
INVENTOR(S) : Stanford R. Ovshinsky et al.

It is certified that error appears in the above—identified patent and that said Letters Patent is hereby corrected as shown below:

Claim 12, column 28, line 1, change "10" to --11--.
Claim 15, column 28, lines 33 and 34, change "imaging-forming" to --image-forming--.
Claim 19, column 29, line 5, change "joule" to --Joule--.
Claim 21, column 29, line 64, change "dog-image" to --dot-image--.
Claim 25, column 30, line 58, change "microsized" to --micro-sized--.
Claim 29, column 31, line 33, change "microsized" to --micro-sized--.
Claim 30, column 32, lines 13 and 14, change "discernable" to --discernible--.

Signed and Sealed this

Seventh Day of June 1983

[SEAL]

Attest:

DONALD J. QUIGG

Attesting Officer      Acting Commissioner of Patents and Trademarks